(12) United States Patent
Westnedge et al.

(10) Patent No.: US 8,454,040 B2
(45) Date of Patent: Jun. 4, 2013

(54) HEAVY-DUTY AXLE-TO-BEAM CONNECTION

(75) Inventors: Andrew J. Westnedge, Bolingbrook, IL (US); Dmitriy E. Rubalskiy, Glenview, IL (US); Michael J. Keeler, Naperville, IL (US); Phillippi R. Pierce, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 29 days.

(21) Appl. No.: 13/248,597

(22) Filed: Sep. 29, 2011

(65) Prior Publication Data
US 2012/0080862 A1 Apr. 5, 2012

Related U.S. Application Data

(60) Provisional application No. 61/388,276, filed on Sep. 30, 2010.

(51) Int. Cl.
*B60G 9/02* (2006.01)
*B60G 7/00* (2006.01)

(52) U.S. Cl.
USPC .................................. 280/124.116; 301/124.1

(58) Field of Classification Search
USPC ......... 280/124.1, 124.116, 124.156, 124.175; 267/52; 301/124.1, 134, 135, 137; 29/515, 29/516, 517
See application file for complete search history.

(56) References Cited

U.S. PATENT DOCUMENTS

| | | | |
|---|---|---|---|
| 1,329,479 A * | 2/1920 | Savon | 285/382.2 |
| 1,548,990 A * | 8/1925 | Garman | 403/285 |
| 1,703,037 A * | 2/1929 | Heck | 228/136 |
| 1,906,290 A * | 5/1933 | Urschel | 267/52 |
| 2,929,617 A * | 3/1960 | Gray et al. | 267/2 |
| 3,773,347 A * | 11/1973 | Traylor | 280/124.116 |
| 4,575,145 A | 3/1986 | Wolfram et al. | |
| 5,116,075 A | 5/1992 | Pierce | |
| 5,366,237 A | 11/1994 | Dilling et al. | |
| 5,375,871 A | 12/1994 | Mitchell et al. | |
| 5,634,655 A | 6/1997 | Chalin | |
| 5,639,110 A | 6/1997 | Pierce et al. | |
| 5,690,353 A | 11/1997 | Vandenberg | |
| 6,015,350 A * | 1/2000 | Breese | 464/162 |
| 6,059,378 A | 5/2000 | Dougherty et al. | |
| 6,240,806 B1 | 6/2001 | Morris et al. | |
| 6,241,266 B1 | 6/2001 | Smith et al. | |

(Continued)

FOREIGN PATENT DOCUMENTS

EP 0625440 B1 5/1994
EP 1334848 B1 1/2003

(Continued)

*Primary Examiner* — Joseph Rocca
(74) *Attorney, Agent, or Firm* — Dureska, Kennedy & Moore, LLC; David P. Dureska; Brent L. Moore

(57) ABSTRACT

An axle-to-beam connection for a vehicle axle/suspension system includes an axle having at least one depression formed therein. A sleeve is formed with at least one depression and disposed about the axle so that the axle depression and the sleeve depression matingly engage one another to form a mated pair of depressions. A method of forming the axle-to-beam connection includes providing an axle and disposing a sleeve about the axle. At least one mated pair of depressions is simultaneously formed in the axle and the sleeve. The sleeve is immovably mounted to a vehicle axle/suspension system.

12 Claims, 26 Drawing Sheets

U.S. PATENT DOCUMENTS

| | | | |
|---|---|---|---|
| 6,508,482 B2 | 1/2003 | Pierce et al. | |
| 6,842,956 B1 * | 1/2005 | Amborn et al. | 29/421.1 |
| 7,007,960 B2 | 3/2006 | Chalin et al. | |
| 7,066,479 B2 * | 6/2006 | Melton | 280/124.11 |
| 7,347,435 B2 | 3/2008 | Chalin | |
| 8,226,099 B2 * | 7/2012 | Koschinat | 280/124.116 |
| 2005/0006869 A1 * | 1/2005 | Hughes | 280/124.128 |
| 2005/0127633 A1 * | 6/2005 | Fader et al. | 280/124.106 |
| 2006/0033304 A1 | 2/2006 | Saieg et al. | |
| 2006/0163834 A1 | 7/2006 | Brereton et al. | |
| 2009/0072505 A1 | 3/2009 | McGinnis | |
| 2009/0224503 A1 | 9/2009 | Richardson | |
| 2012/0228847 A1 * | 9/2012 | Aalderink | 280/124.116 |

FOREIGN PATENT DOCUMENTS

| | | |
|---|---|---|
| WO | 8705369 A1 | 9/1987 |
| WO | 9706022 A1 | 2/1997 |
| WO | 2009014423 A1 | 1/2009 |
| WO | 2009035520 A1 | 3/2009 |

\* cited by examiner

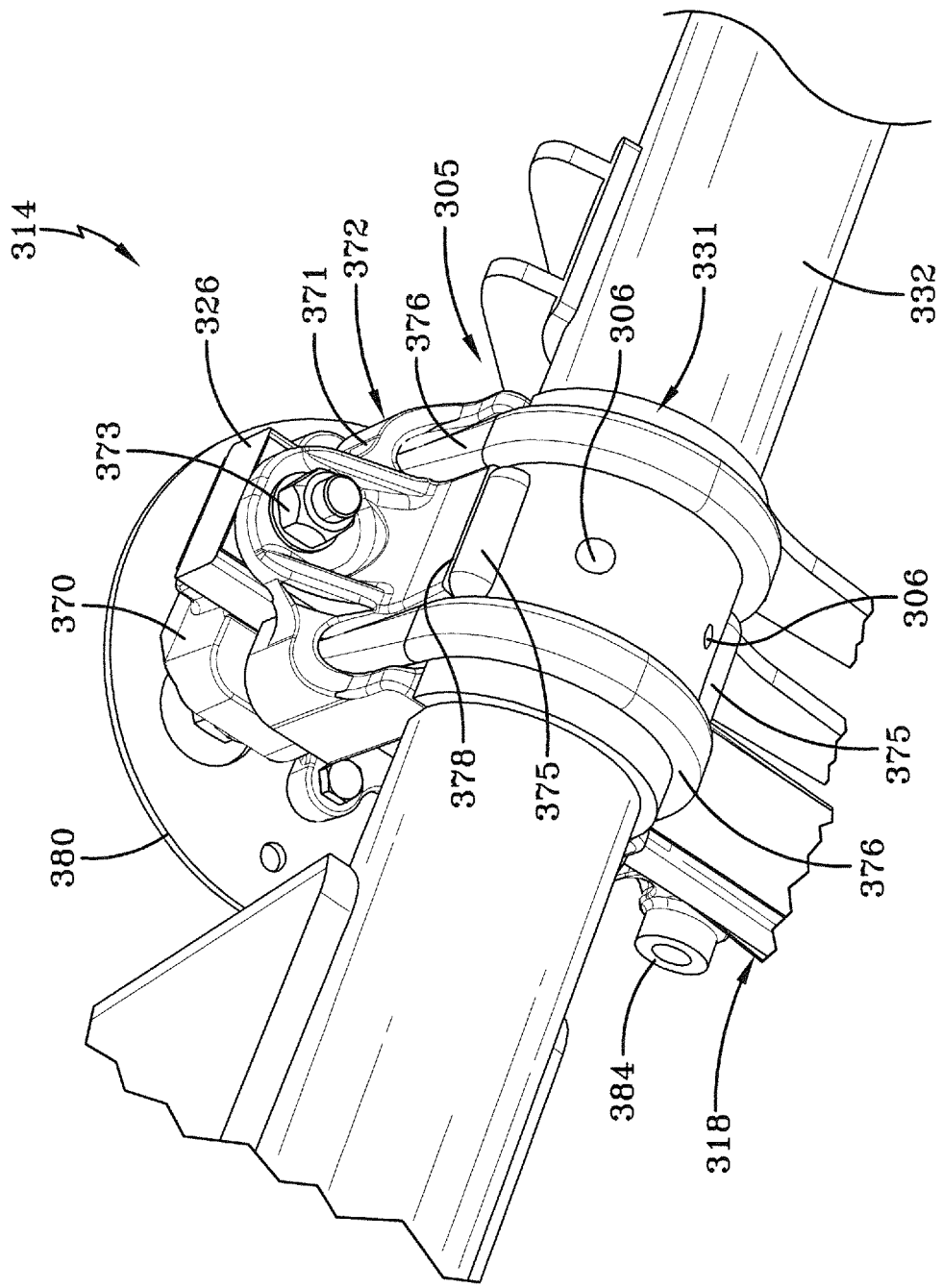

HEAVY-DUTY AXLE-TO-BEAM CONNECTION

CROSS REFERENCE TO RELATED APPLICATION

This application claims the benefit of U.S. Provisional Patent Application Ser. No. 61/388,276, filed Sep. 30, 2010.

BACKGROUND OF THE INVENTION

1. Field of the Invention

The invention relates to vehicle axle/suspension systems, and in particular to the suspension assemblies of those systems which are useful for heavy-duty vehicles such as trucks and tractor-trailers. More particularly, the invention is directed to a heavy-duty trailing or leading aim axle/suspension system for trucks and tractor-trailers, in which the axle is securely and efficiently connected to the beams by an improved axle sleeve and axle structure at the axle-to-beam connection. The improved axle sleeve and axle structure, together with the manner in which the axle-to-beam connection is made and assembled, eliminates welds on the axle. Elimination of the welds on the axle in turn eliminates stress risers and localized mechanical property changes in the axle caused by such welds, and thereby increases durability of the axle and the axle-to-beam connection.

2. Background Art

The use of air-ride trailing and leading arm rigid beam-type axle/suspension systems has been very popular in the heavy-duty truck and tractor-trailer industry for many years. Air-ride trailing and leading arm spring beam-type axle/suspension systems also are often used in the industry. For the purpose of convenience and clarity, reference herein will be made to beams, with the understanding that such reference is by way of example, and that the present invention applies to heavy-duty vehicle air-ride axle/suspension systems that utilize rigid-type beams or spring-type beams and also to heavy-duty vehicle mechanical axle/suspension systems. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of: primary frames, movable subframes and non-movable subframes.

Specifically, each suspension assembly of an axle/suspension system includes a longitudinally extending elongated beam. Each beam typically is located adjacent to and below a respective one of a pair of spaced-apart longitudinally extending main members and one or more cross members, which form the frame of the vehicle. More specifically, each beam is pivotally connected at one of its ends to a hanger, which in turn is attached to and depends from a respective one of the main members of the vehicle. The beams of the axle/suspension system can either be an overslung/top-mount configuration or an underslung/bottom-mount configuration. For the purposes of convenience and clarity hereinafter, a beam having an overslung/top-mount configuration shall be referred to as an overslung beam with the understanding that such reference is by way of example, and that the present invention applies to both overslung/top-mount configurations and underslung/bottom-mount configurations. An axle extends transversely between and typically is connected by some means to the beams of the pair of suspension assemblies at a selected location from about the mid-point of each beam to the end of the beam opposite from its pivotal connection end. The end of each beam opposite from its pivotal connection end also is connected to a bellows air spring or its equivalent, which in turn is connected to a respective one of the main members. A brake assembly and one or more shock absorbers also are mounted on the axle/suspension system. A height control valve is mounted on the hanger and is also operatively connected to the beam in order to maintain the ride height of the vehicle. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams, which extend either rearwardly or frontwardly with respect to the front end of the vehicle.

The axle/suspension systems of the heavy-duty vehicle act to cushion the ride and stabilize the vehicle. More particularly, as the vehicle is traveling over-the-road, its wheels encounter road conditions that impart various forces, loads, and/or stresses, collectively referred to herein as forces, to the respective axle on which the wheels are mounted, and in turn, to the suspension assemblies that are connected to and support the axle. In order to minimize the detrimental affect of these forces on the vehicle as it is operating, the axle/suspension system is designed to react or absorb at least some of the forces.

These forces include vertical forces caused by vertical movement of the wheels as they encounter certain road conditions, fore-aft forces caused by acceleration and deceleration of the vehicle, and side-load and torsional forces associated with transverse vehicle movement, such as turning of the vehicle and lane-change maneuvers. In order to address such disparate forces, axle/suspension systems have differing structural requirements. More particularly, it is desirable for an axle/suspension system to be fairly stiff in order to minimize the amount of sway experienced by the vehicle and thus provide what is known in the art as roll stability. However, it is also desirable for an axle/suspension system to be relatively flexible to assist in cushioning the vehicle from vertical impacts, and to provide compliance so that the components of the axle/suspension system resist failure, thereby increasing durability of the axle/suspension system.

One type of prior art axle/suspension system and axle-to-beam connection is shown, described and/or claimed in U.S. Pat. No. 5,366,237, and is owned by the assignee of the present invention. This axle/suspension system provides a means for rigidly connecting the axle to the beam through a connection that substantially surrounds the axle, thereby preventing the axle from assuming a cross-sectional configuration substantially different from its manufactured unaltered cross-sectional configuration due to torsional forces. In one embodiment of the invention shown, described and/or claimed in the '237 patent, the means for rigidly connecting the axle to the beam includes an orifice formed in each of the beam sidewalls. Each orifice substantially surrounds both the axle, which extends through the orifices, and a sleeve that substantially surrounds and is rigidly attached to the axle. The sleeve in turn is rigidly attached to the beam through the orifices in the beam. The sleeve includes a pair of windows into which a continuous weld is laid in order to rigidly attach the sleeve to the axle. These windows are typically located on the front and rear portions of the axle. A weld is laid circumferentially around the axle between the sleeve and each beam sidewall at the sidewall orifice in order to rigidly attach the axle to the beam. An S-cam bearing and a brake chamber of a brake actuation mechanism are attached to the beam.

The welding of the axle sleeve directly to the axle, at the sleeve windows, can potentially create significant stress risers and local mechanical property changes in the axle, as is generally well known in the art. These stress risers and local mechanical property changes in the axle can in turn potentially reduce the life expectancy of the axle.

In response to the considerations created by welding the sleeve directly to the axle, in certain prior art applications axle wall thickness has been increased or other axle-to-beam connection variants have been created without welds where the beam is clamped to the axle via mechanical fasteners, such as U-bolts. However, these mechanically fastened axle-to-beam connection variants are often heavier than the welded variants and often require re-torque of the mechanical fasteners. In addition, increasing axle wall thickness also can undesirably increase weight.

The axle-to-beam connection of the present invention overcomes the aforementioned considerations associated with axle/suspension systems that utilize prior art axle-to-beam connections by eliminating welds on the axle and thereby producing a mechanical lock at the axle-to-beam connection of the axle/suspension system. The elimination of the welds on the axle at the sleeve windows eliminates both stress risers and local mechanical property changes in the axle caused by the welds, thereby improving the life and durability of the axle-to-beam connection.

SUMMARY OF THE INVENTION

Objectives of the present invention include providing a heavy-duty vehicle axle-to beam connection that eliminates welds on the axle of the axle/suspension system.

A further objective of the present invention is to provide a heavy-duty vehicle axle-to-beam connection that produces a mechanical lock between the sleeve and the axle of the axle/suspension system.

Yet another objective of the present invention is to provide a heavy-duty vehicle axle-to-beam connection that improves the life and durability of the axle-to-beam connection.

These objectives and advantages are obtained by the axle-to-beam connection for an axle/suspension system that includes an axle, which is formed with at least one depression. A sleeve is also formed with at least one depression. The sleeve is disposed at least partially about the axle so that the at least one axle depression matingly engages with the at least one sleeve depression to form a mated pair of depressions. The sleeve is immovably mounted to the suspension assembly of the axle/suspension system.

These objectives and advantages are also obtained by the method of forming an axle-to-beam connection for an axle/suspension system including the following steps: a) providing an axle; b) disposing a sleeve about at least a portion of the axle; c) simultaneously forming at least one mated pair of depressions in the sleeve and the axle to attach the sleeve to the axle; and d) immovably mounting the sleeve to the suspension assembly of the axle/suspension system.

These objectives and advantages are also obtained by the axle-to-beam connection for an axle/suspension system including an axle and a sleeve disposed about the axle. The sleeve is swaged, squeezed or crimped onto the axle. The sleeve is immovably mounted to the suspension assembly of the axle/suspension system.

BRIEF DESCRIPTION OF THE SEVERAL VIEWS OF THE DRAWINGS

The preferred embodiments of the present invention, illustrative of the best mode in which applicants have contemplated applying the principles, are set forth in the following description and are shown in the drawings, and are particularly and distinctly pointed out and set forth in the appended claims.

FIG. 11 is an enlarged fragmentary bottom perspective view of the second preferred embodiment axle-to-beam connection of the present invention shown in FIG. 10A;

Similar numerals refer to similar parts throughout the drawings.

DESCRIPTION OF THE PREFERRED EMBODIMENT

Figure 1:
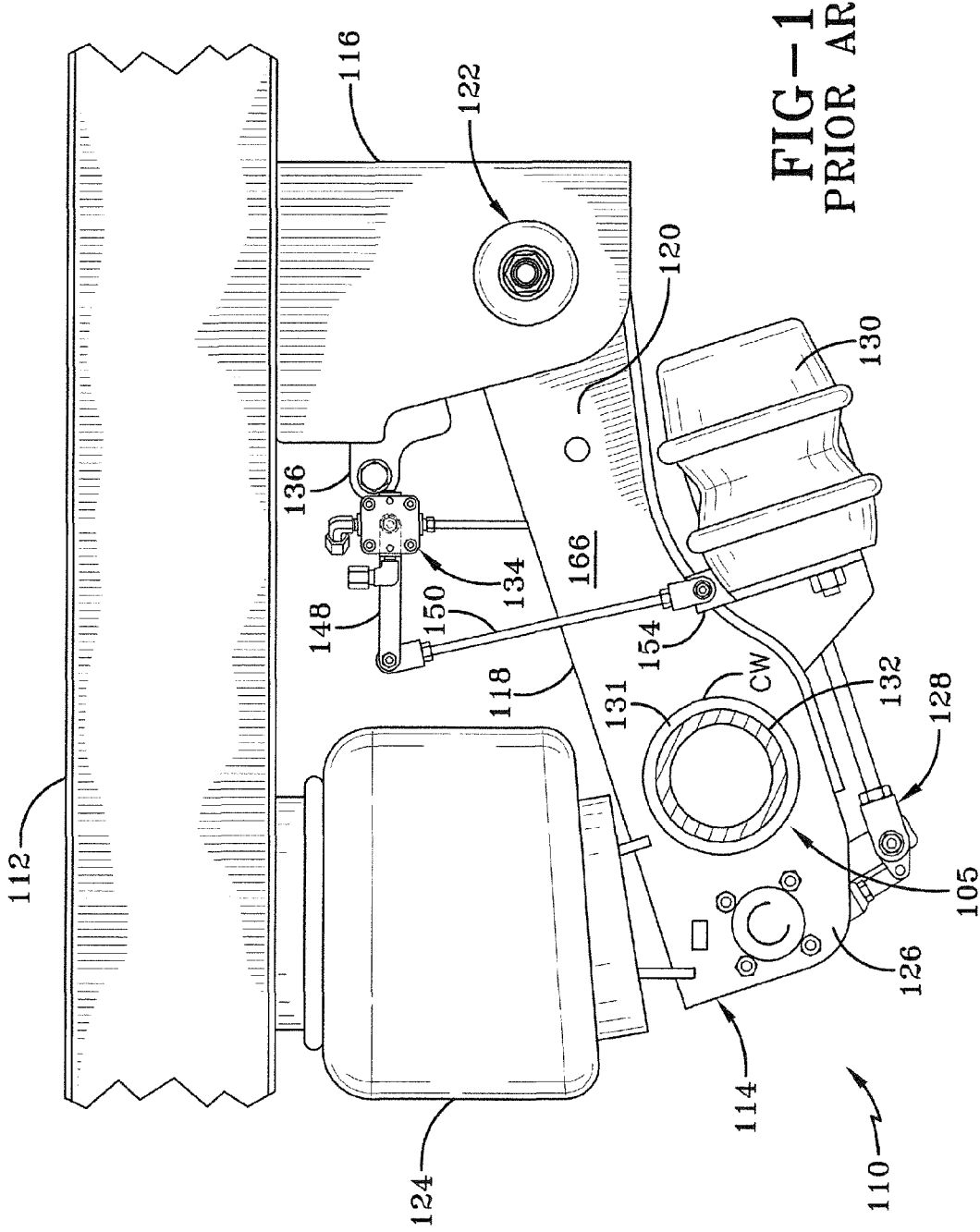
FIG. 1 is a fragmentary elevational view of a prior art air-ride axle/suspension system mounted on a vehicle frame, showing one of the suspension assemblies and the axle in section surrounded by and rigidly attached to a sleeve which in turn is surrounded by and rigidly attached to a trailing arm overslung rigid beam of the suspension assembly.

A prior art trailing arm overslung beam-type air-ride axle/suspension system is indicated generally at 110, is shown in FIG. 1 mounted on a main member 112 of a heavy-duty vehicle (not shown), and now will be described.

It should be noted that main member 112 is generally representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. For the purpose of convenience, main member 112 is shown in FIG. 1 as a primary frame. Moreover, because axle/suspension system 110 includes a pair of suspension assemblies 114 (only one of which is shown in FIG. 1) that generally mirror one another, for sake of clarity only one of the suspension assemblies will be described below.

Suspension assembly 114 is pivotally connected to a hanger 116 via a trailing arm overslung beam 118. More specifically, trailing arm beam 118 includes a front end 120 having a bushing assembly 122, which includes a bushing, pivot bolts and washers as are well known in the art and will be described below, to facilitate pivotal connection of the beam to hanger 116. Beam 118 also includes a rear end 126, which is welded or otherwise rigidly attached to a transversely-extending axle 132. A sleeve 131 is disposed about axle 132 between the axle and beam 118. A circumferential weld (not shown) is laid around axle 132 at a junction CW between sleeve 131 and each one of a pair of sidewalls 166 (FIGS. 2 and 3) of beam 118.

Suspension assembly 114 also includes an air spring 124 mounted on and extending between rear end 126 of beam 118 and main member 112. A height control valve 134 is mounted on hanger 116 via a bracket 136 in a manner well known to those having skill in the art. Height control valve 134 includes a lever 148 that is attached to beam 118 via a link 150 and a bracket 154. For the sake of relative completeness, a brake system 128 including a brake chamber 130 is shown mounted on prior art suspension assembly 114.

As mentioned above, axle/suspension system 110 is designed to absorb forces that act on the vehicle as it is operating. More particularly, it is desirable for axle/suspension system 110 to be rigid or stiff in order to resist roll forces and thus provide roll stability for the vehicle. This is typically accomplished by using beam 118, which is rigid, and which is also rigidly attached to axle 132 via a prior art axle-to-beam connection 105. It is also desirable, however, for axle/suspension system 110 to be flexible to assist in cushioning the vehicle (not shown) from vertical impacts and to provide compliance so that the axle/suspension system resists failure. Such flexibility typically is achieved through the pivotal connection of beam 118 to hanger 116 with bushing assembly 122. Air spring 124 and a shock absorber (not shown) also assist in cushioning the ride for cargo and passengers.

Figure 2:
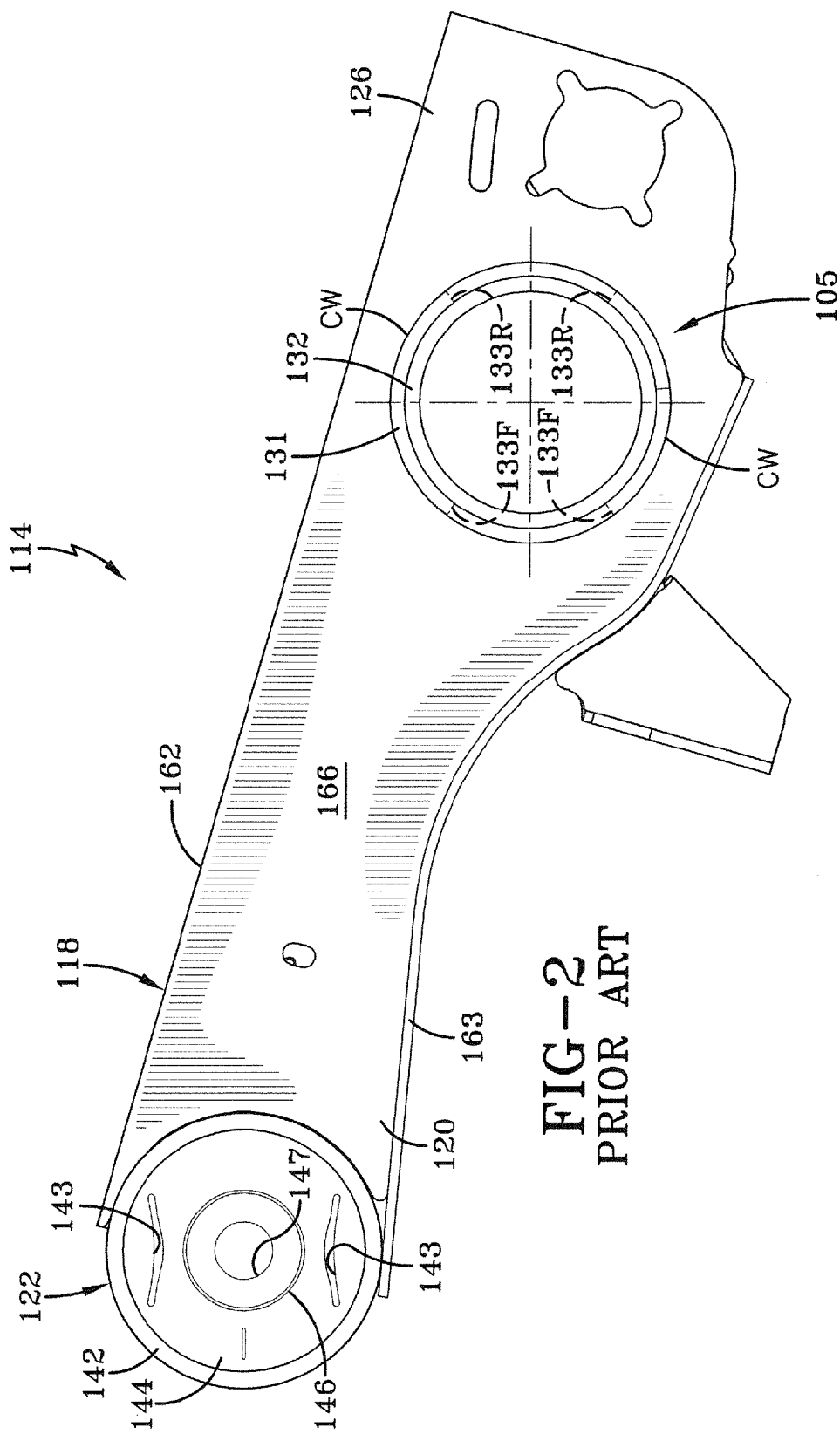
FIG. 2 is an enlarged elevational view of the suspension assembly beam shown in FIG. 1, showing the bushing assembly and the front and rear sleeve windows adjacent to the axle.
Figure 3:
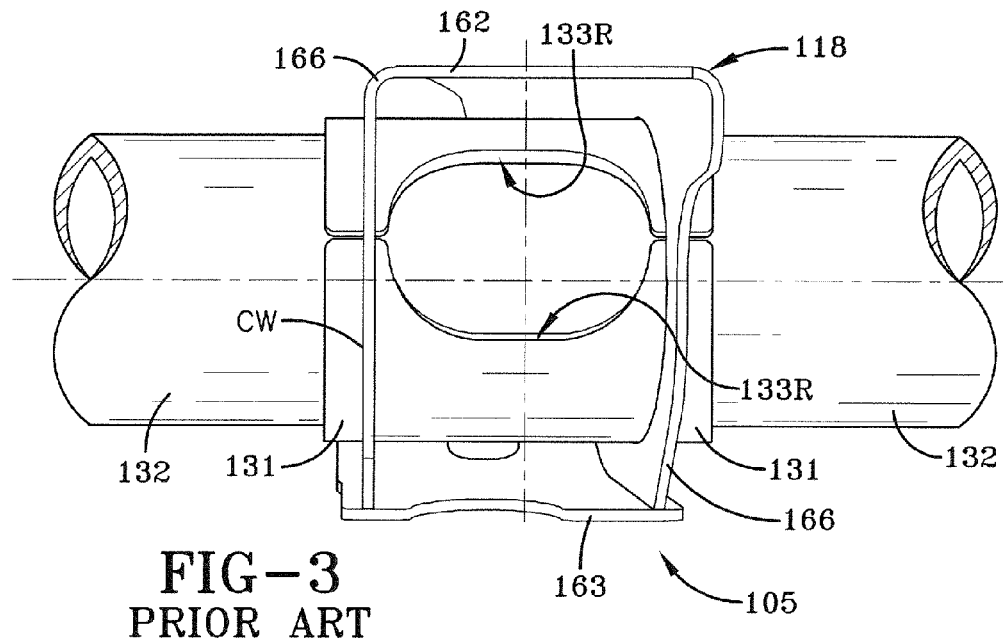
FIG. 3 is a fragmentary rear elevational view of the axle-to-beam connection of the prior art suspension assembly shown in FIG. 1, showing the rear window formed in the sleeve.
Figure 4:
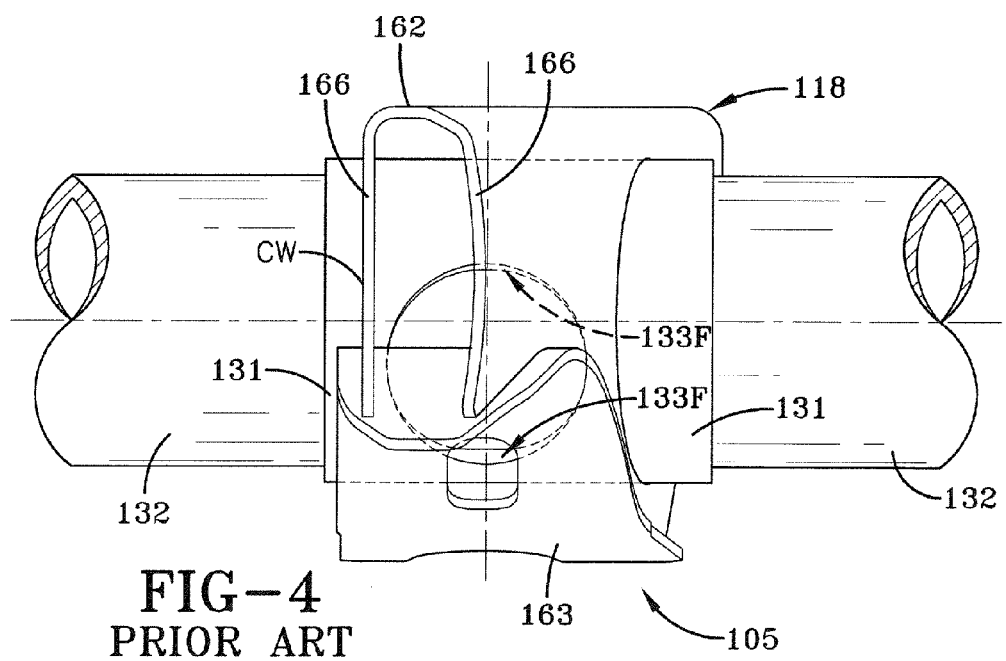
FIG. 4 is a fragmentary front elevational view of the axle-to-beam connection of the prior art suspension assembly shown in FIG. 1, with hidden portions represented by broken lines, showing the front window formed in the sleeve.

Turning now to FIGS. 2-4, overslung tapered beam 118 is shown. Beam 118 includes sidewalls 166 integrally formed with a top plate 162 in a generally inverted U-shape. A bottom plate 163 is attached to the bottom portions of sidewalls 166 opposite top plate 162. Front end 120 of beam 118 includes bushing assembly 122 of a type which is well known in the heavy-duty axle/suspension system art. More particularly, bushing assembly 122 includes a mounting tube 142 formed of robust steel and an elastomeric bushing 144 press fit into the tube. Bushing 144 is molded about and adhesively attached to a central metal sleeve 146 formed with a continuous opening 147. Bushing sleeve 146 passes completely through bushing 144 and extends outwardly from the sidewalls thereof to facilitate pivotal mounting of beam 118 on hanger 116, which is described above. As is well known in the art, the durometer of elastomeric bushing 144 can be varied depending on the application and the bushing deflection properties desired. To generally achieve a softer radial bushing rate in the vertical direction and a stiffer radial bushing rate in the fore-aft direction, bushing 144 is formed with a pair of vertically-spaced voids 143 in each of its sidewalls.

With continuing reference to FIGS. 2-4, axle 132 is shown surrounded by sleeve 131. A front window 133F is formed in sleeve 131 adjacent the front portion of axle 132. A rear window 133R is formed in sleeve 131 adjacent the rear portion of axle 132.

Rear window 133R (FIG. 3) is shown formed in sleeve 131 which is disposed around and attached to axle 132 by a continuous weld (not shown) laid around the window in a manner well known to those skilled in the art.

Turning now to FIG. 4, front window 133F is shown formed in sleeve 131, which is disposed about and attached to axle 132 by a continuous weld (not shown) laid along the window in a manner well known to those skilled in the art.

As set forth above, the welding of sleeve 131 directly to axle 132, at front and rear sleeve windows 133F,R, can potentially create significant stress risers and local mechanical property changes in the axle, as is generally well known to those having skill in the art. These stress risers and local mechanical property changes in the axle can in turn potentially reduce the life expectancy and durability of axle 132.

These potential issues are solved by the axle-to-beam connection of the present invention, which is described in detail below.

Figure 5:
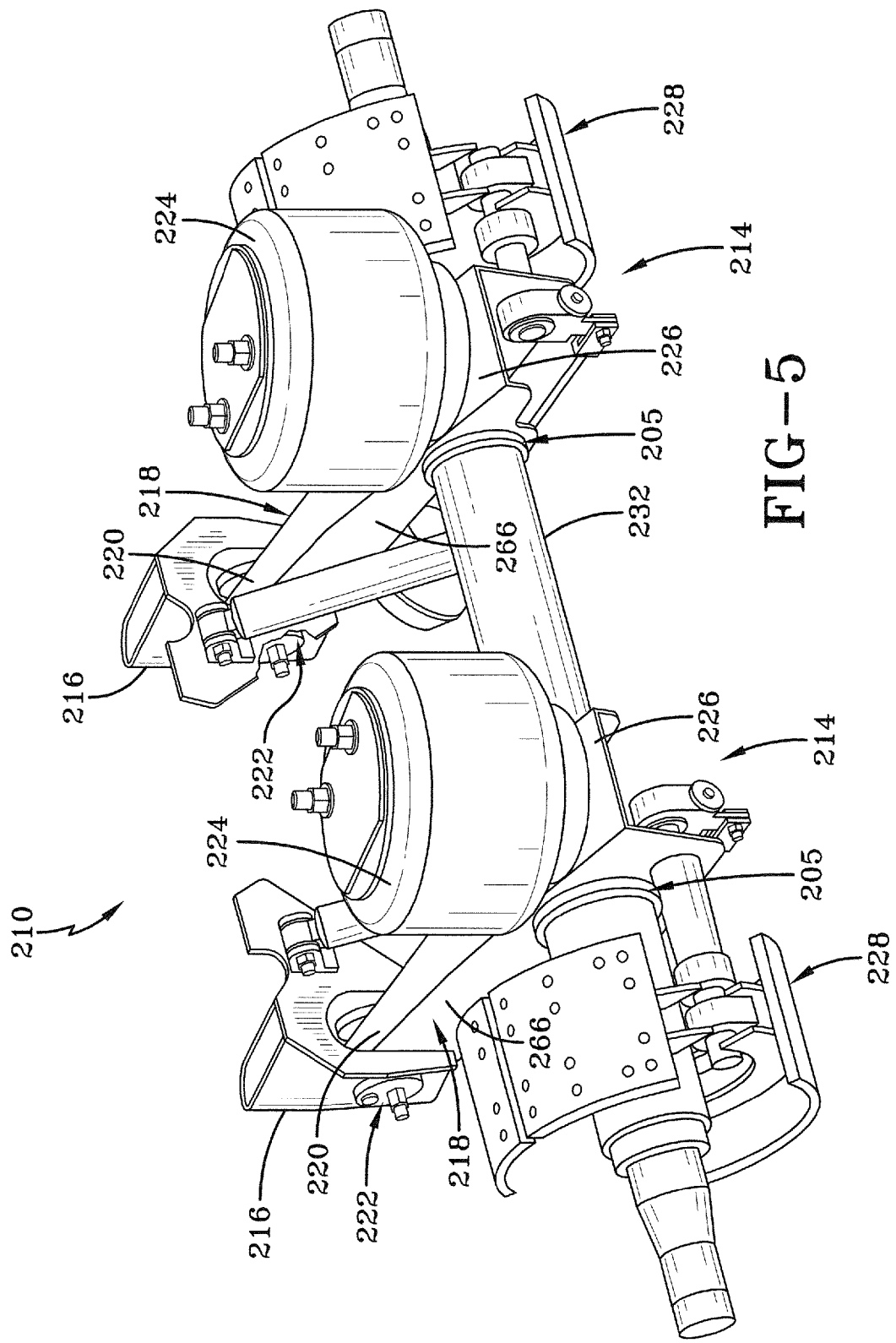
FIG. 5 is a top rear perspective view of an axle/suspension system incorporating a pair of first preferred embodiment axle-to-beam connections of the present invention, and showing the axle extending between a pair of suspension assemblies of the axle/suspension system.

A first preferred embodiment axle-to-beam connection of the present invention is shown generally at 205 in FIG. 5 on a trailing arm air-ride overslung beam-type axle/suspension system 210. Axle/suspension system 210 includes a pair of suspension assemblies 214 that generally mirror one another. For sake of clarity, only one of suspension assemblies 214 will be described below.

With additional reference to FIGS. 6-9, suspension assembly 214 is pivotally connected to a hanger 216 via a trailing arm overslung tapered beam 218. More specifically, trailing arm beam 218 includes a front end 220 having a bushing assembly 222, which includes a bushing, pivot bolts and washers as are well known in the art and which are described in detail above in conjunction with axle/suspension system 110, to facilitate pivotal connection of the beam to hanger 216. Tapered beam 218 also includes a rear end 226, which is welded or otherwise rigidly attached to a transversely-extending axle 232, as will be described in greater detail below in accordance with the concepts of the present invention. A sleeve 231 (FIGS. 6-9) is disposed about axle 232 between the axle and beam 218. A circumferential weld (not shown) is laid generally around axle 232 at a junction CW (FIGS. 6 and 7) between sleeve 231 and each of a pair of sidewalls 266 of beam 218. It should be understood that other types of either continuous or non-continuous welds could also be utilized, such as spot welds or segmented welds and the like, without changing the overall concept or function of the present invention.

With continued reference to FIG. 5, suspension assembly 214 also includes an air spring 224 mounted on and extending between rear end 226 of beam 218 and the main member of the vehicle (not shown). For the sake of relative completeness, a brake system 228 is shown mounted on suspension assembly 214.

As mentioned above, axle/suspension system 210 is designed to absorb forces that act on the vehicle as it is operating. More particularly, it is desirable for axle/suspension system 210 to be rigid or stiff in order to resist roll forces and thus provide roll stability for the vehicle. This is typically accomplished by using beam 218, which is rigid, and also is rigidly attached to axle 232. It is also desirable, however, for axle/suspension system 210 to be flexible to assist in cushioning the vehicle (not shown) from vertical impacts and to provide compliance so that the axle/suspension system resists failure. Such flexibility typically is achieved through the pivotal connection of beam 218 to hanger 216 with bushing assembly 222. Air spring 224 and a shock absorber (not shown) also assist in cushioning the ride for cargo and passengers.

Figure 6:
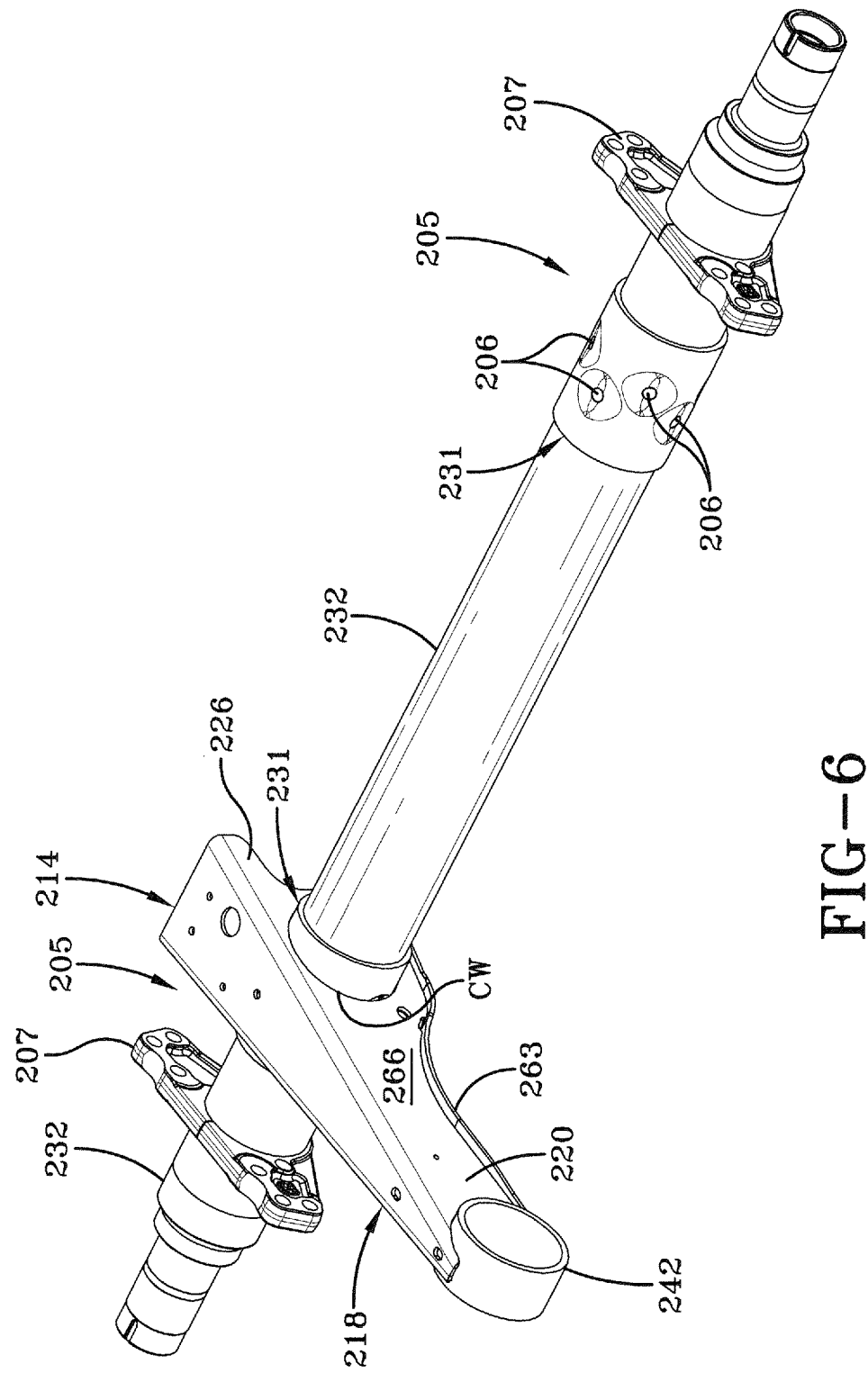
FIG. 6 is a front perspective view of the axle shown in FIG. 5 incorporating the pair of first preferred embodiment axle-to-beam connections of the present invention, showing the axle mounted on the curb side beam with the driver side beam removed and showing depressions formed in the driver side axle sleeve and also showing a pair of brake torque plates.
Figure 7:
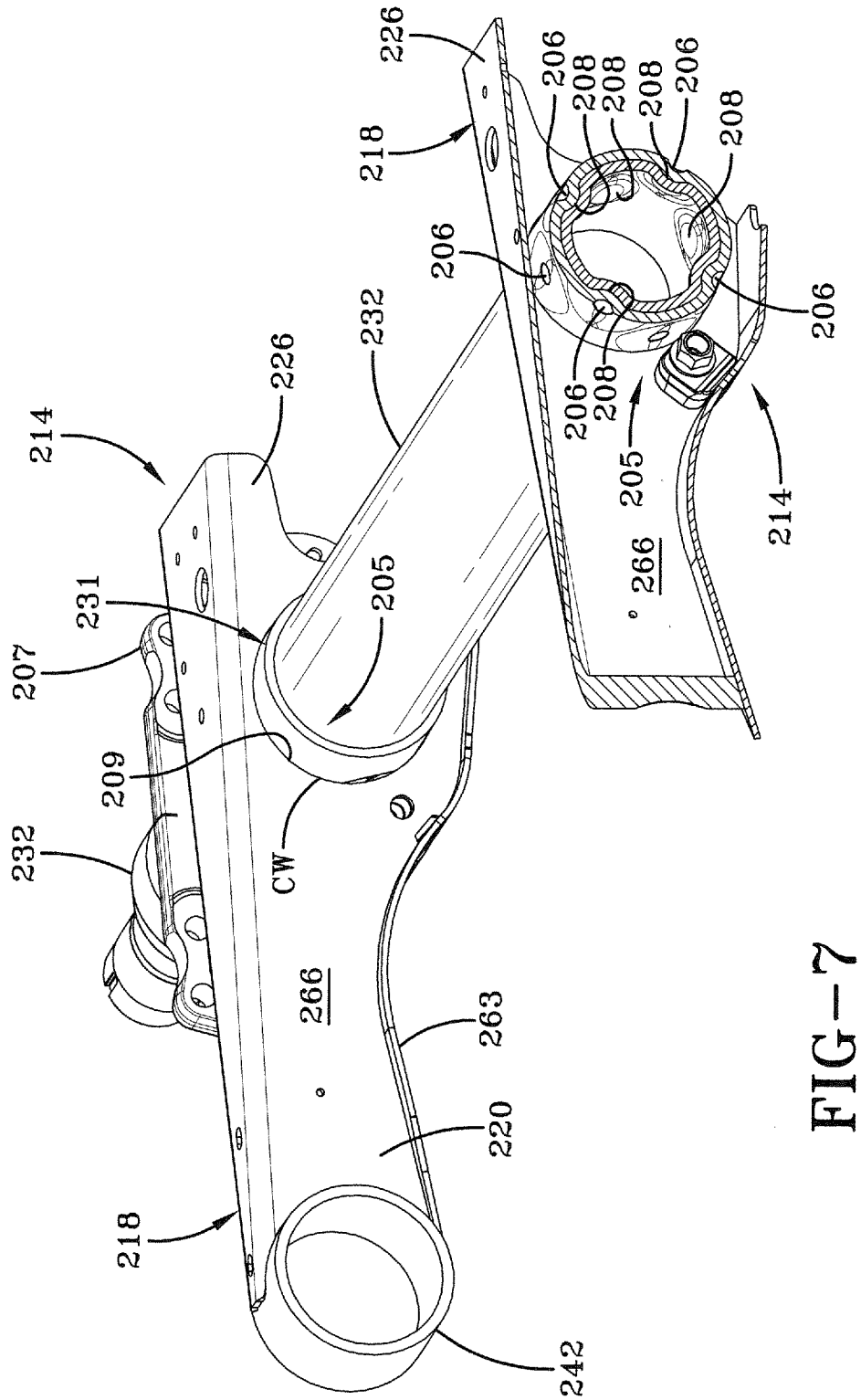
FIG. 7 is a fragmentary perspective view similar to FIG. 6, but with a portion of the driver side beam shown mounted around the driver side axle sleeve and axle, both of which are shown in section.

With continued reference to FIGS. 6 and 7, axle 232 of axle/suspension system 210 is shown with curb side overslung tapered beam 218 and a portion of driver side beam 218 (FIG. 7). Beam 218 includes sidewalls 266 integrally formed with a top plate 262 in a generally inverted U-shape. A bottom plate 263 is attached to the bottom portions of sidewalls 266 opposite top plate 262. Front end 220 of beam 218 includes a bushing tube 242 of a type which is well known in the heavy-duty axle/suspension system art. An elastomeric bushing (not shown) is disposed in bushing tube 242. As is well known in the art, the durometer of elastomeric bushing (not shown) can be varied depending on the application and the bushing deflection properties desired. To generally achieve a softer radial bushing rate in the vertical direction and a stiffer radial bushing rate in the fore-aft direction, the bushing is formed with a pair of vertically-spaced voids (not shown) in each of its sidewalls. A brake torque plate 207 is disposed around and attached to axle 232 near each end of the axle.

Figure 8:
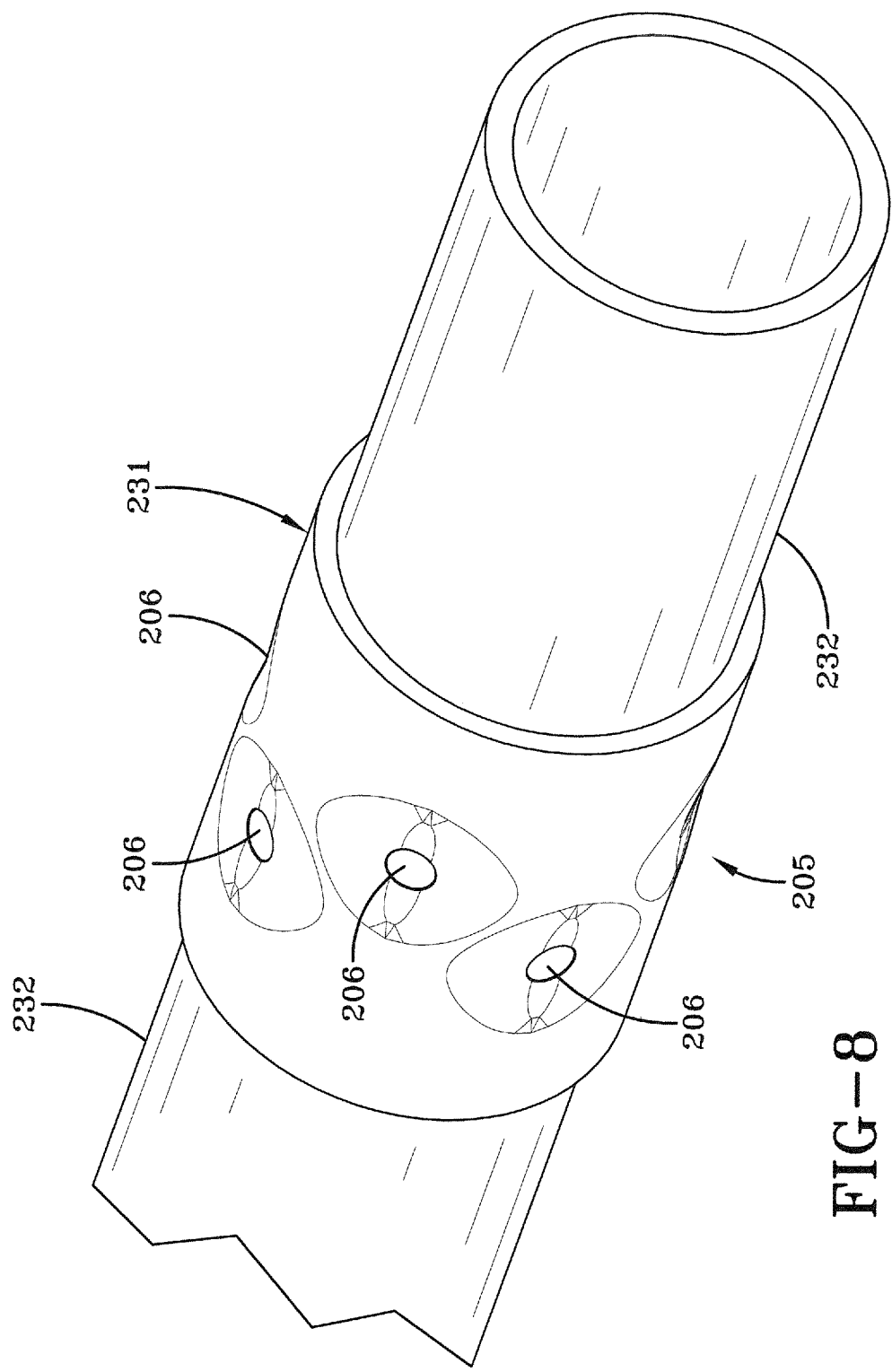
FIG. 8 is a greatly enlarged fragmentary perspective view of the driver side axle sleeve shown in FIGS. 6 and 7, showing the axle sleeve mounted on the axle and showing the depressions formed in the axle sleeve.
Figure 9:
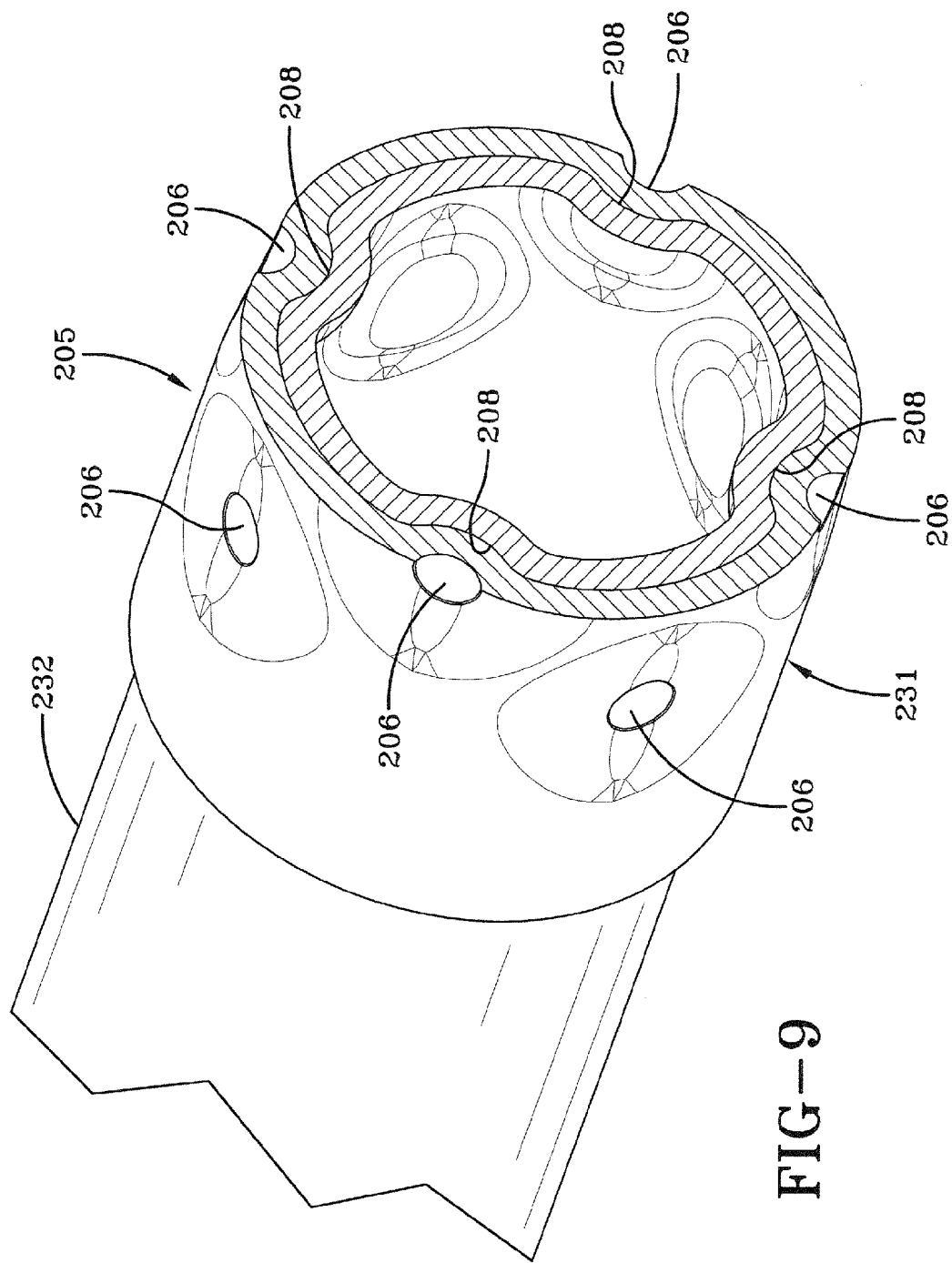
FIG. 9 is a view similar to FIG. 8, but showing the driver side axle sleeve mounted on the axle with both the axle sleeve and the axle in section and showing the depressions foil led in the axle sleeve and the axle.

With particular reference to FIGS. 8 and 9, and in accordance with one of the primary features of the present invention, sleeve 231 and axle 232 are each formed with mated pairs of depressions 206 and 208, respectively. More particularly, eight mated pairs of depressions 206,208 are formed in offset or staggered rows around the circumference of sleeve 231 and axle 232. Each mated pair of depressions 206,208 engage one another and serve as a mechanical joint or lock between sleeve 231 and axle 232. It should be understood that at least one mated pair of depressions is necessary in order for axle-to-beam connection 205 of the present invention to function properly, but from one to seven and also more than eight mated pairs of depressions could be utilized without changing the overall concept or operation of the present invention. In addition, at least one of the eight mated pairs of depressions 206,208 exhibits sufficient contact to eliminate welds on axle 232. It is understood that the mechanical lock between sleeve 231 and axle 232 generally prevents rotation and lateral movement of the sleeve and the axle relative to one another.

Sleeve 231 is a generally rectangular shaped flat piece of metal which is formed around axle 232 in a manner well known in the art. A weld (not shown) is placed along the edges of the seam (not shown) of sleeve 231 in order to dispose the sleeve around axle 232. It should be understood that sleeve 231 could also be formed from a tube having an inner diameter equal to or slightly larger than the outer diameter of axle 232. In such an instance, sleeve tube 231 is cut to size and then slip fit over the end of axle 232. Sleeve 231 is optionally swaged, squeezed or crimped onto axle 232 by a swaging device as is well known in the art, creating sufficient contact between the sleeve and the axle. Eight mated pairs of depressions 206 and 208 are plastically formed in sleeve 231 and axle 232, respectively, by a press. More particularly, sleeve 231 and axle 232 are placed into a press (not shown) having a pin (not shown), whereby the pin is pressed into the exterior surface of the sleeve and the axle by the press and then retracted, thereby forming each mated pair of depressions 286, 288 in the sleeve and the axle, respectively. More specifically, a first mated pair of depressions 206,208 is simultaneously formed in sleeve 231 and axle 232, respectively. Then a second mated pair of depressions 206,208 is simultaneously formed in sleeve 231 and axle 232, respectively, and so on until all eight mated pairs of the depressions have been formed in the sleeve and the axle. Axle 232 is supported in a manner generally well known in the art such that the axle does not collapse during formation of the depressions.

After depressions 206,208 have been formed in sleeve 231 and axle 232, respectively, the axle is disposed into an opening 209 (FIG. 7) formed in beam 218. A weld (not shown), as described above, is laid along junction CW between sleeve 231 and the exterior surface of beam sidewall 266 at beam opening 209, around the entire circumference of the sleeve. In this manner, axle to-beam connection 205 is formed without welding axle 232.

As set forth above in the detailed description of axle-to-beam connection 205 of the present invention, the axle-to-beam connection results in a mechanical lock and sufficient contact of sleeve 231 to axle 232 which is free of welds or additional mechanical fasteners. More particularly, axle-to-beam connection 205 of the present invention creates sufficient contact between at least one of, and preferably all of, the eight mated pairs of depressions 206,208 of sleeve 231 and axle 232, respectively, to provide durability and strength to the sleeve to axle connection. Preferably, the contact creates a pre-load or compression at depressions 206,208 of sleeve 231 and axle 232, respectively. Because sleeve 231 is formed from a different material than the material used to form axle 232, the sleeve exhibits a more plastic deformation while the axle exhibits a more elastic deformation. As a result, axle 232 exhibits more spring-back than sleeve 231 during the depression forming process, aiding in creating the sufficient contact between the sleeve and the axle. It should be understood that the extent of the preload or compression exhibited by mated depressions 206,208 of sleeve 231 and axle 232, respectively, is dependant on the yield strength of the materials used in forming the sleeve and the axle, as well as the relative thicknesses of the sleeve and the axle. Therefore, by changing the types of materials used for sleeve 231 and axle 232 as well as varying the thicknesses of each, axle-to-beam connection 205 can be tuned to create an increased or decreased preload or compression at depressions 206,208 in order to optimize the sufficient contact of the axle-to-beam connection. Residual stresses preferably also are created at each one of the eight mated pairs of depressions 206,208 of sleeve 231 and axle 232, respectively, as a result of the forming process. These residual stresses also aid in creating the sufficient contact and in reacting loads encountered by axle/suspension system 210 during operation of the heavy-duty vehicle. Swaging, as described above, can also contribute to sufficient contact at the sleeve to axle connection.

It is further contemplated that an adhesive could optionally be applied to the interior surface of sleeve 231 or to the exterior surface of axle 232 at the sleeve-to-axle interface, prior to formation of depressions 206,208. Because axle-to-beam connection 205 of the present invention eliminates welds directly on axle 232 and the stress risers and local mechanical property changes that occur with such welds, the durability of the axle can be improved, thereby improving the durability of axle-to-beam connection 205.

Figure 9A:
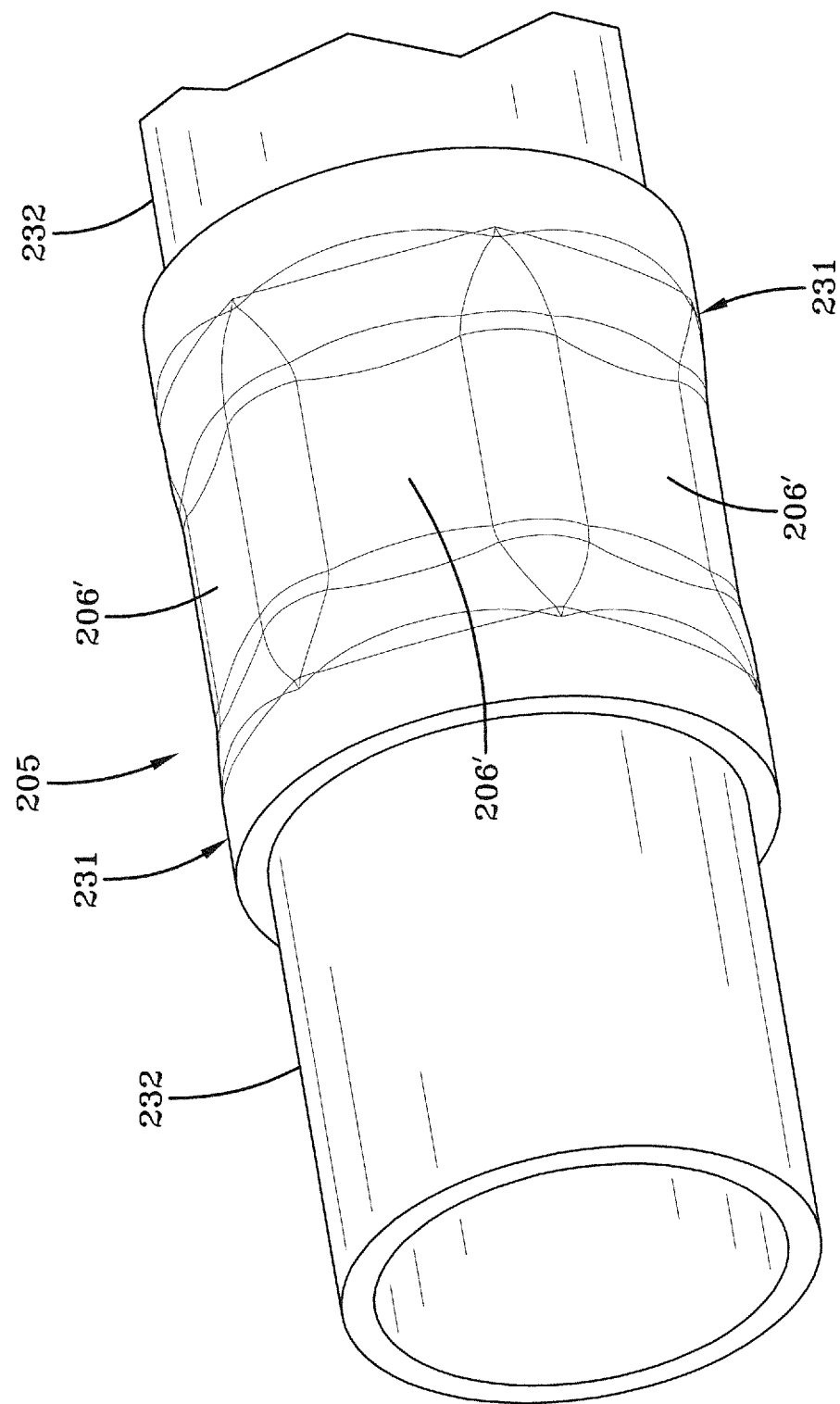
FIG. 9A is a view similar to FIG. 8, but showing the axle sleeve mounted on the axle, showing the hexagonally arranged generally flat depressions formed in the axle sleeve.
Figure 9B:
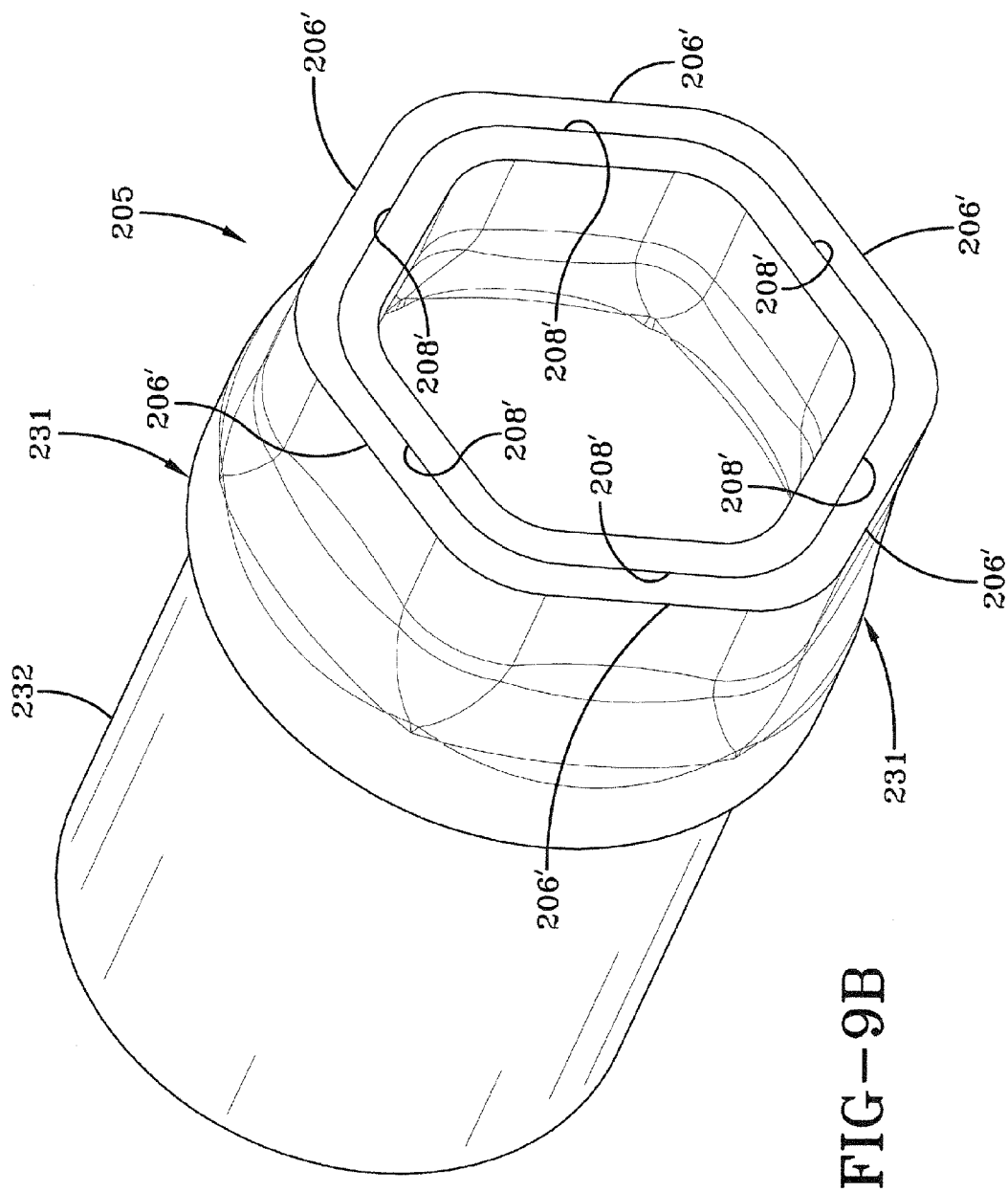
FIG. 9B is a view similar to FIG. 9, but showing the axle sleeve mounted on the axle, showing the hexagonally arranged generally flat depressions formed in the axle and the axle sleeve.

It is contemplated that other shapes and arrangements of depressions 206,208 could also be utilized without changing the overall concept of the present invention. It is also contemplated that variations of depressions 206,208 could also be utilized, such as a generally hexagonal flat depression 206', 208', without changing the overall concept or operation of the present invention, as shown in FIGS. 9A and 9B. Other shapes, sizes and numbers of depressions 206,208 are also contemplated and could be utilized in conjunction with the present invention.

The manner in which axle-to-beam connection 205 is formed eliminates tolerance issues with respect to alignment of depressions 206,208 formed in sleeve 231 and axle 232, respectively, because each one of the mated pairs of depressions are simultaneously formed in the sleeve and the axle. More particularly, prior art structures and methods have utilized a depression in the axle, but in comparison and contrast, employ a separately formed similarly-shaped sphere in the axle seat shell, with the shell and the axle being subsequently brought together so that the sphere and the depression generally mate with one another. However, this prior art structure and process creates tolerance issues between the sphere and the depression of the separate components, resulting in irregular fit or alignment of the components and non-uniform contact between the surfaces of the sphere and depression of the shell and the axle. These tolerance issues have been overcome by axle-to-beam connection 205 of the present invention which simultaneously forms the mated pairs of depressions 206,208 in sleeve 231 and axle 232, respectively, thereby eliminating irregular fit, alignment and non-uniform contact issues.

Figure 10:
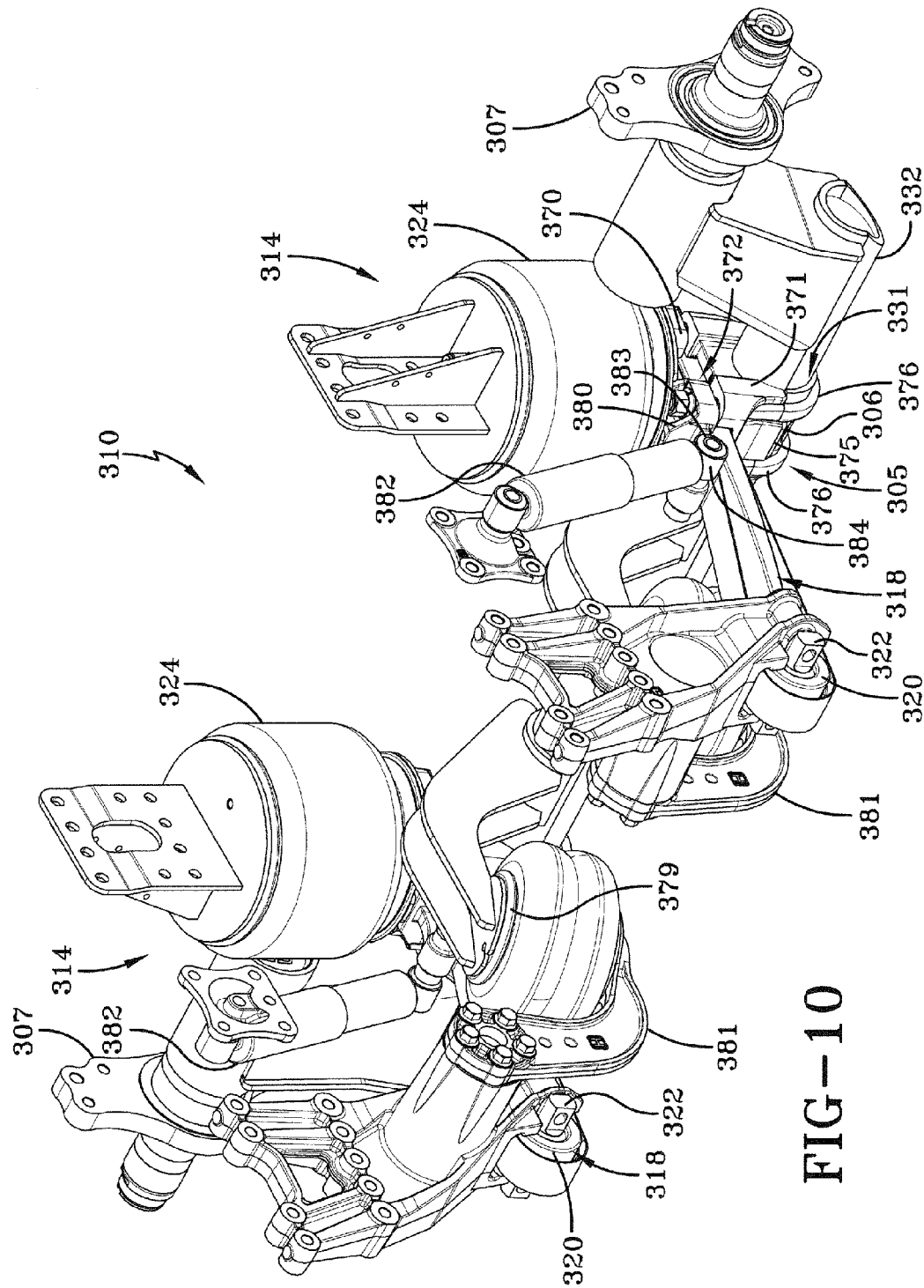
FIG. 10 is a front driver side perspective view of a second preferred embodiment axle-to-beam connection of the present invention incorporated into a mid-lift spring beam axle/suspension system for a heavy-duty vehicle, showing the lift mechanism, air springs, and shock absorbers.
Figure 10A:
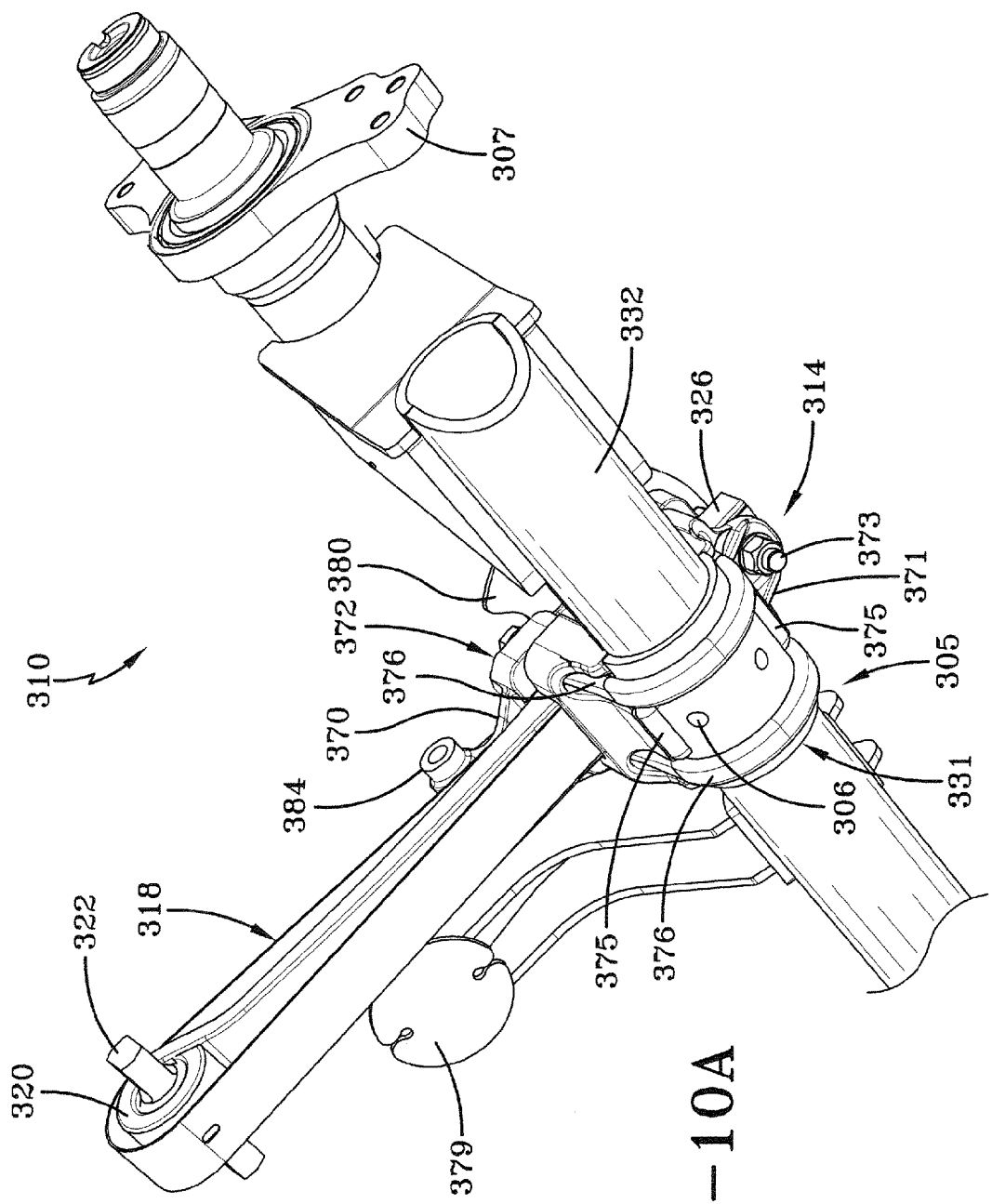
FIG. 10A is a fragmentary bottom perspective view of the second preferred embodiment axle-to-beam connection of the present invention shown in FIG. 10, but showing a portion of the lift mechanism, air springs and shock absorbers removed and showing the driver side spring beam and the depressions formed in the driver side axle sleeve.

A second preferred embodiment axle-to-beam connection is shown generally at 305 in FIGS. 10 and 10A on a mid-lift axle/suspension system 310. Mid-lift axle/suspension system 310 is capable of being lifted during operation of the vehicle and is generally well known to those having skill in the art. Axle/suspension system 310 includes a pair of suspension assemblies 314 that generally mirror one another. For sake of clarity, only one of suspension assemblies 314 will be described below.

Figure 12:
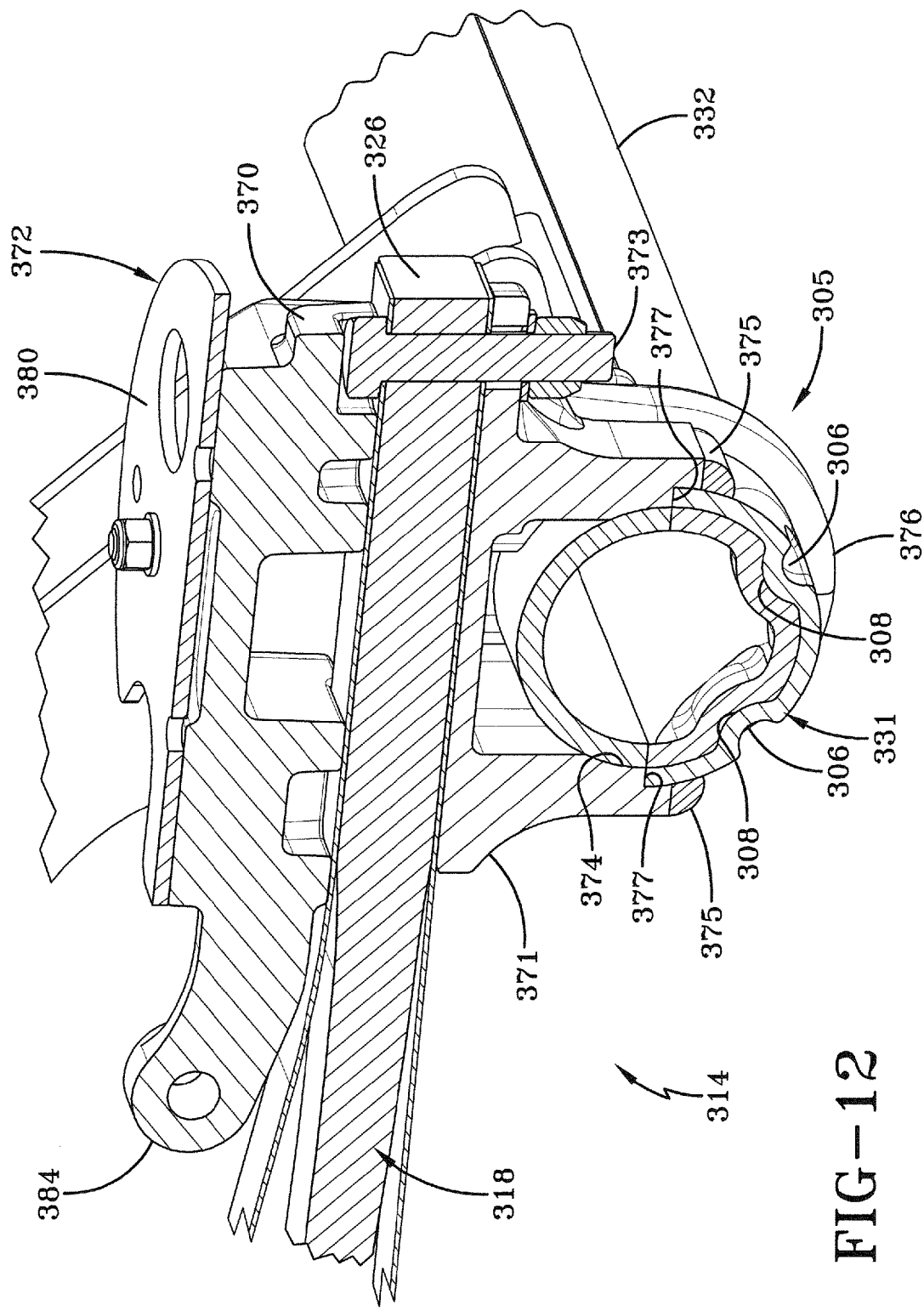
FIG. 12 is a fragmentary rear perspective view of the second preferred embodiment axle-to-beam connection of the present invention shown in FIG. 10A, showing the driver side spring seat assembly, spring beam, axle sleeve and axle in section, and showing the depressions formed in the axle sleeve and the axle.
Figure 13:
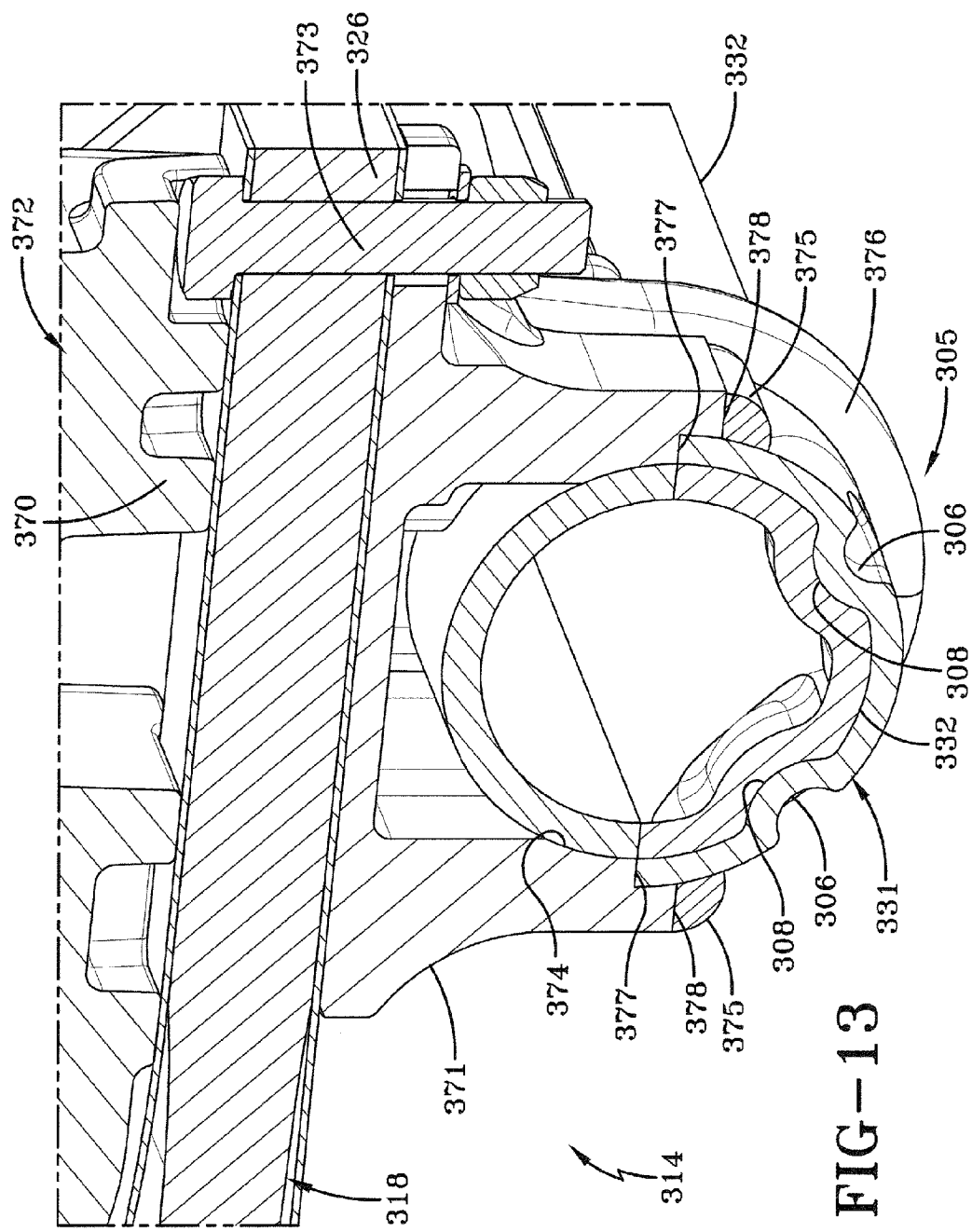
FIG. 13 is an enlarged fragmentary perspective view similar to the view shown in FIG. 12.

With additional reference to FIGS. 11-13, suspension assembly 314 includes a spring beam 318. Spring beam 318 includes a front end 320 and a rear end 326. Spring beam front end 320 is formed with a loop having a circular opening (not shown) through which a pivot assembly 322 is disposed. Spring beam rear end 326 is sandwiched between an upper portion 370 and a lower portion 371 of a spring seat assembly 372. Spring beam rear end 326 is formed with a circular opening (not shown) through which a beam fastener 373 is disposed. An air spring mount 380 is formed on the top of upper portion 370 of spring seat assembly 372. Lower portion 371 of spring seat assembly 372 is formed with a semi-circular recess 374 (FIGS. 12 and 13) into which generally the upper portion of an axle 332 is disposed. A sleeve 331 is disposed around generally the bottom portion of axle 332 and seats in a longitudinally-spaced pair of lower shoulders 377 (FIGS. 12 and 13) formed in lower portion 371 of spring seat assembly 372. Welds 375 are laid along the junction between sleeve 331 and a bottom-most edge 378 (FIGS. 11 and 13) of spring seat assembly lower portion 371. It should be understood that other types of either continuous or non-continuous welds could also be utilized, such as spot welds or segmented welds and the like, without changing the overall concept or function of the present invention. A pair of U-bolts 376 each are disposed through pairs of aligned openings (not shown) in upper and lower portion 370,371 of spring seat assembly 372, and are secured thereto in a manner well known to those having skill in the art. U-bolts 376 serve in conjunction with welds 375 to connect sleeve 331, which captures axle 332, to spring seat assembly 372. It should be noted that U-bolts 376 are not intended to create a preload or compression between sleeve 331 and axle 332, as is the case with certain types of prior art axle/suspension systems. A brake torque plate 307 (FIGS. 10 and 10A) is mounted adjacent each end of axle 332.

With particular reference to FIG. 10, a lift mechanism mount 379 is attached to axle 332 in a manner well known to those skilled in the art. A lift mechanism 381 is operatively mounted to lift mechanism mount 379 and functions to lift axle 332 during operation of the heavy-duty vehicle. An air spring 324 mounts on air spring mount 380 in a manner well known to those having skill in the art, such as fasteners. A shock absorber 382 is mounted via fastener 383 to a shock mount 384 formed on upper portion 370 of spring seat assembly 372 (FIG. 10).

In accordance with one of the primary features of the present invention, sleeve 331 and axle 332 are formed with two mated pairs of depressions 306,308, respectively. Each mated pair of depressions engage one another and serve as a mechanical lock between sleeve 331 and axle 332. More specifically, a first mated pair of depressions 306,308 is simultaneously formed in sleeve 331 and axle 332, respectively. Then, the second mated pair of depressions 306,308 is simultaneously formed in sleeve 331 and axle 332, respectively.

Sleeve 331 is a generally rectangular shaped flat piece of metal which is formed around the generally lower portion of axle 332 in a manner well known in the art. As described above, welds 375 are laid along the junction between sleeve 331 and bottom-most edge 378 of lower portion 371 in order to dispose the sleeve around the generally lower portion of axle 332. Depressions 306 and 308 are plastically formed in sleeve 331 and axle 332, respectively, by a press. More particularly, sleeve 331 and axle 332 are placed into a press (not shown) having a pin (not shown), whereby the pin is pressed into the exterior surface of the sleeve and the axle by the press and then retracted, thereby forming each mated pair of depressions 386, 388 in the sleeve and the axle, respectively. Axle 332 is supported in a manner generally well known in the art such that the axle does not collapse during formation of the depressions.

More specifically, in second preferred embodiment axle-to-beam connection 305, two mated pairs of spaced-apart depressions 306,308, are formed in the bottom portion of sleeve 331 and axle 332. Each one of the mated pairs of depressions 306,308 align with one another and serve as a mechanical lock between sleeve 331 and axle 332. It is understood that at least one mated pair of depressions are necessary in order for axle-to-beam connection 305 of the present invention to function properly, but more than two could also be utilized without changing the overall concept of the present invention. In addition, at least one of the two mated pairs of depressions 306,308 exhibits sufficient contact to eliminate welds on axle 332.

As set forth above in the detailed description of axle-to-beam connection 305 of the present invention, the axle-to-beam connection results in a mechanical lock and sufficient contact of sleeve 331 to axle 332 which is free of welds or additional mechanical fasteners. More particularly, axle-to-beam connection 305 of the present invention creates sufficient contact between at least one of, and preferably both of the mated pairs of depressions 306,308 of sleeve 331 and axle 332, respectively, to provide durability and strength to the sleeve to axle connection. Preferably, the contact creates a pre-load or compression at depressions 306,308 of sleeve 331 and axle 332, respectively. Because sleeve 331 is formed from a different material than the material used to form axle 332, the sleeve exhibits a more plastic deformation while the axle exhibits a more elastic deformation. As a result, axle 332 exhibits more spring-back than sleeve 331 during the depression forming process, aiding in creating the sufficient contact between the sleeve and the axle. It should be understood that the extent of the preload or compression exhibited by mated depressions 306,308 of sleeve 331 and axle 332, respectively, is dependant on the yield strength of the materials used in forming the sleeve and the axle, as well as the relative thicknesses of the sleeve and the axle. Therefore, by changing the types of materials used for sleeve 331 and axle 332 as well as varying the thicknesses of each, axle-to-beam connection 305 can be tuned to create an increased or decreased preload or compression at depressions 306,308 in order to optimize the sufficient contact of the axle-to-beam connection. Residual stresses preferably also are created at each one of the mated pairs of depressions 306,308 of sleeve 331 and axle 332, respectively, as a result of the forming process. These residual stresses also aid in creating the sufficient contact and in reacting loads encountered by axle/suspension system 310 during operation of the heavy-duty vehicle.

It is further contemplated that an adhesive could optionally be applied to the interior surface of sleeve 331 or to the exterior surface of axle 332 at the sleeve-to-axle interface, prior to formation of depressions 306,308. Because axle-to-beam connection 305 of the present invention eliminates welds directly on axle 332 and the stress risers and local mechanical property changes that occur with such welds, the durability of the axle can be improved, thereby improving the durability of axle-to-beam connection 305.

It is contemplated that other shapes, sizes, numbers and arrangements of depressions 306,308 could also be utilized without changing the overall concept of the present invention.

The manner in which axle-to-beam connection 305 is faulted eliminates tolerance issues with regard to alignment of depressions 306,308 formed in sleeve 331 and axle 332, respectively, because each one of the mated pairs of depressions are simultaneously formed in the sleeve and the axle.

Figure 14:
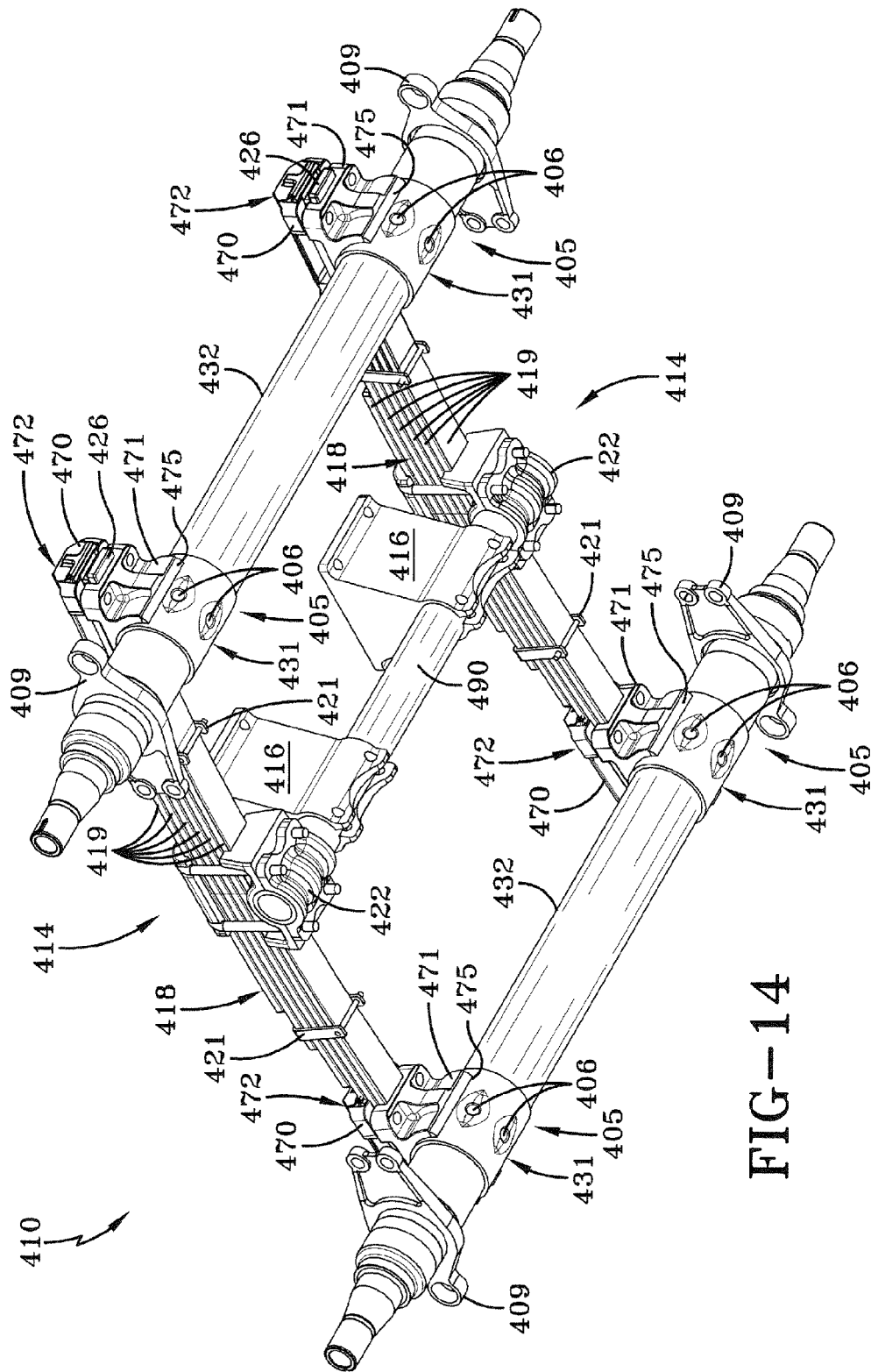
FIG. 14 is a bottom rear perspective view of a third preferred embodiment axle-to-beam connection of the present invention for a tandem axle/suspension system, showing the pair of suspension assemblies, the axle sleeves mounted on the axles and the spring seat assemblies mounted on the axle sleeves, and further showing depressions formed in the axle sleeves.
Figure 15:
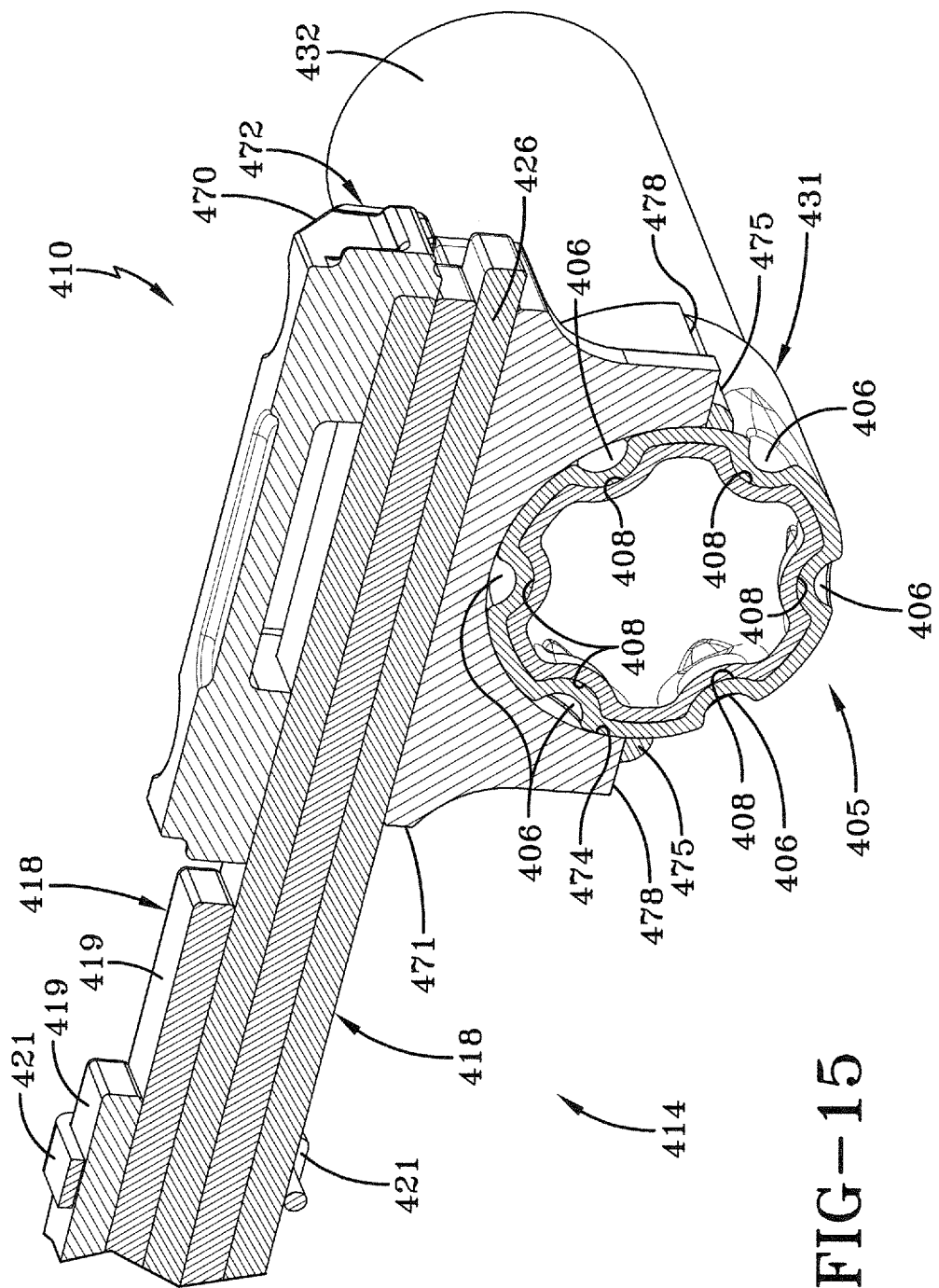
FIG. 15 is an enlarged fragmentary top rear perspective view of the driver side rear axle-to-beam connection shown in FIG. 14, but with the axle, axle sleeve, spring seat assembly, leaf springs and spring leaf U-bolt assembly in section, and showing the depressions formed in the axle sleeve and the axle.
Figure 15A:
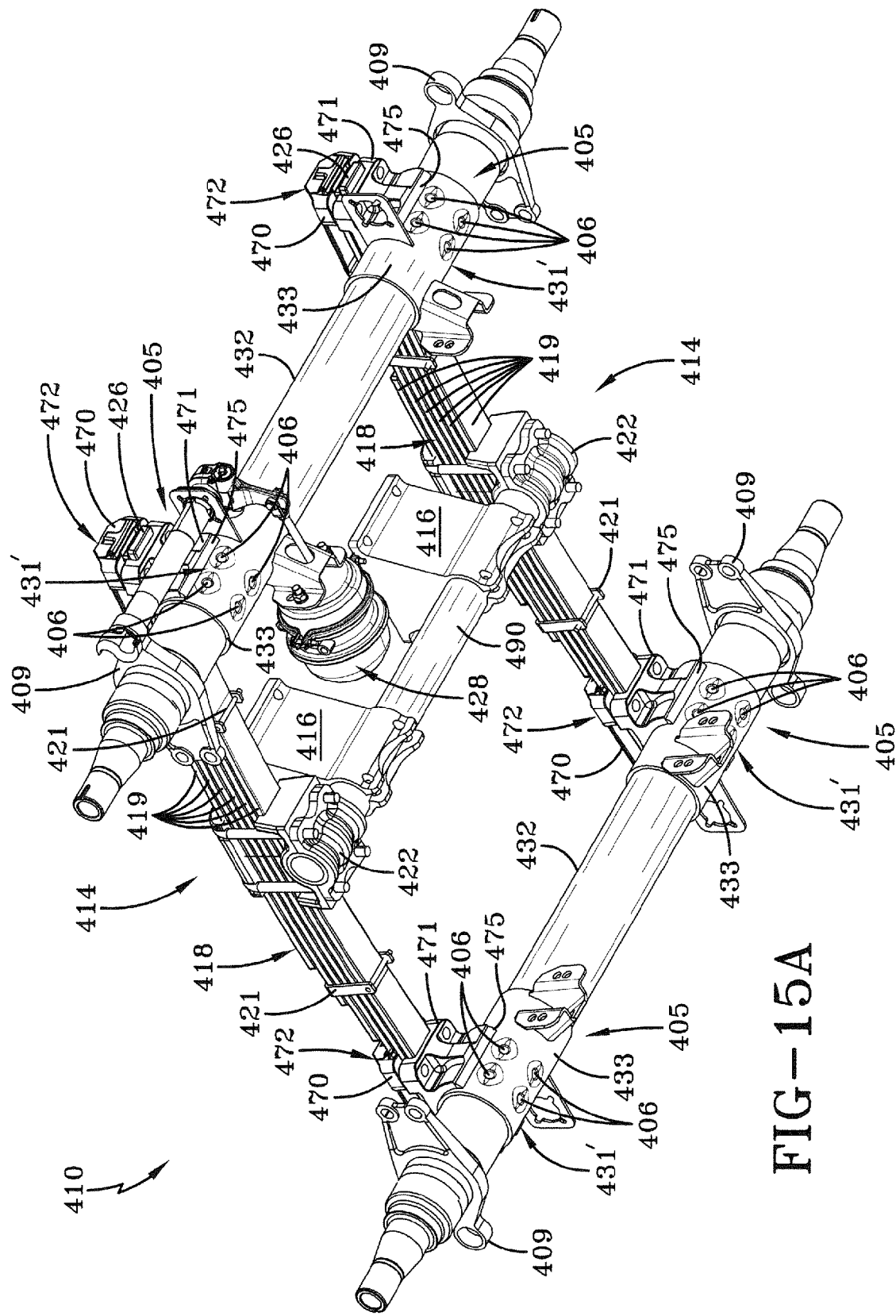
FIG. 15A is a view similar to FIG. 14, but showing an alternative axle sleeve with an inboard extension and transversely aligned rows of depressions, and also showing a brake system mounted on the sleeve extension of the driver side rear suspension assembly.
Figure 15B:
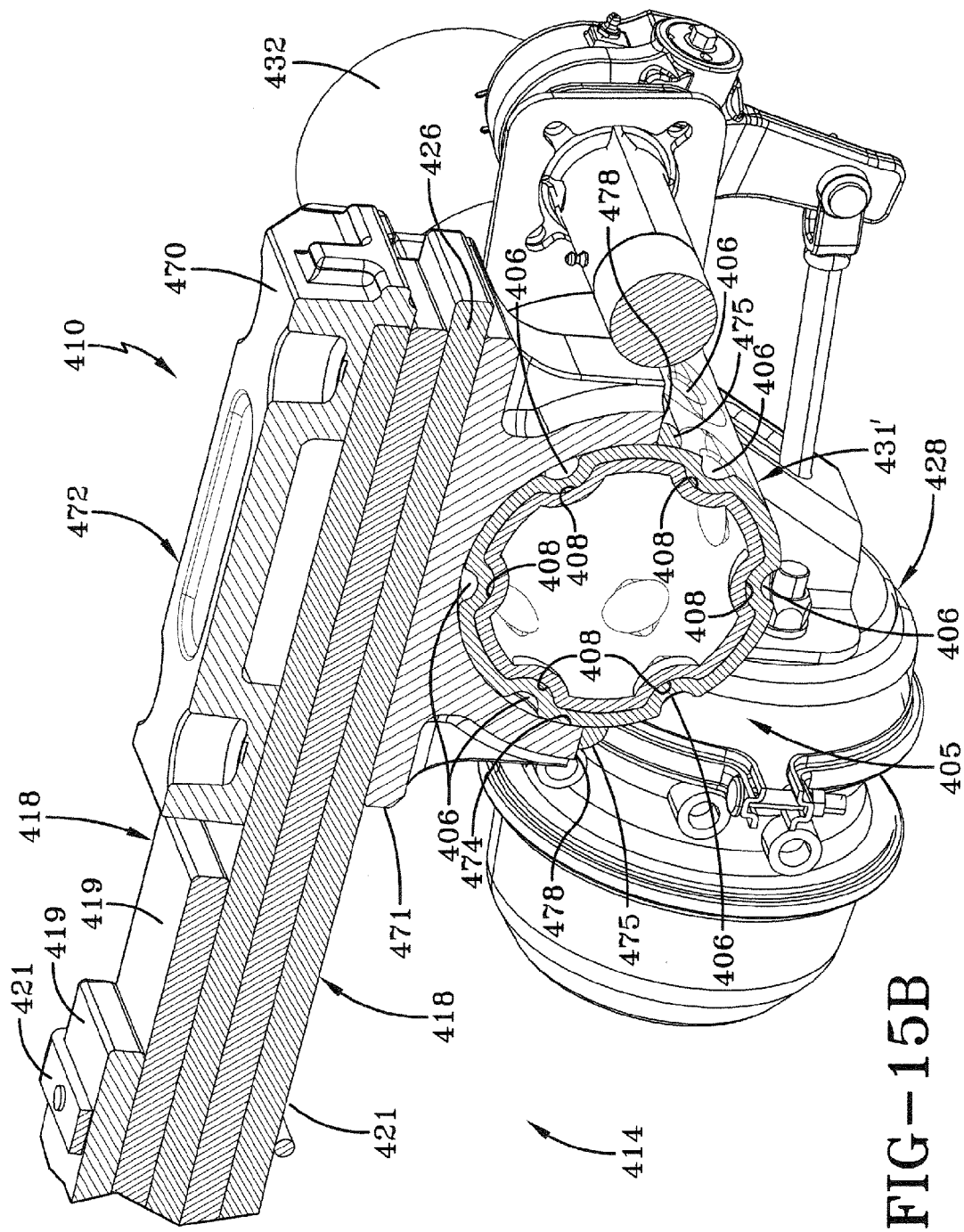
FIG. 15B is an enlarged fragmentary perspective view of the driver side rear axle-to-beam connection shown in FIG. 15A, but with the axle, axle sleeve, spring seat assembly, portions of the brake system, spring beam and spring leaf U-bolt assembly in section, and showing the transversely aligned rows of depressions formed in the axle sleeve and the axle.

A third preferred embodiment axle-to-beam connection is shown generally at 405 in FIGS. 14-15B on a tandem axle/suspension 410. Tandem axle/suspension system 410 is a spring-beam type axle/suspension system, which is generally well known to those having skill in the art. Tandem axle/suspension system 410 includes a pair of suspension assemblies 414 that generally mirror one another. For sake of clarity, only the driver side suspension assembly 414 will be described below.

With specific reference to FIGS. 14 and 15, driver side suspension assembly 414 includes a spring beam 418. Spring beam 418 is formed from vertically stacked leaves 419, which are fastened together by straps 421 and a spring leaf U-bolt assembly 422. A stabilizer bar 490 is fastened to U-bolt 422 and extends between the pair of suspension assemblies 414. A hanger 416 is connected to stabilizer bar 490 and is mounted on the main members (not shown) of the heavy-duty vehicle (not shown). Spring beam 418 includes a front end (not shown) and a rear end 426. Front end (not shown) and rear end 426 of beam 418 are each connected to an axle 432 via front and rear axle-to-beam connections 405, respectively. Because front and rear axle-to-beam connections 405 are generally similar to one another, for sake of clarity, only the rear axle-to-beam connection will be described herein.

More particularly, spring beam rear end 426 is sandwiched between an upper portion 470 and a lower portion 471 of a spring seat assembly 472. Lower portion 471 of spring seat assembly 472 is formed with a semi-circular recess 474 into which a generally upper portion of a sleeve 431 and axle 432 are disposed. Sleeve 431 seats in recess 474 of lower portion 471 of spring seat assembly 472. Welds 475 are laid along the junction between sleeve 431 and a bottom-most edge 478 of lower portion 471 (FIG. 15). Bolts (not shown) are disposed through pairs of aligned openings (not shown) in upper and lower portions 470,471 of spring seat assembly 472 and are secured thereto in a manner well known to those having skill in the art. These bolts serve as a means for attaching end 426 of beam 418 within spring seat assembly 472. A brake spider 409 is mounted adjacent to the end of axle 432.

In accordance with one of the primary features of the present invention, sleeve 431 and axle 432 are formed with depressions 406 and 408, respectively, as shown in FIGS. 14 and 15. More particularly, six mated pairs of depressions 406,408 are formed in and equally spaced around the circumference of sleeve 431 and axle 432. Each mated pair of depressions 406,408 engage one another and serve as a mechanical lock between sleeve 431 and axle 432. It should be understood that at least one mated pair of depressions is necessary in order for axle-to-beam connection 405 of the present invention to function properly, but from one to five and also more than six mated pairs of depressions could be utilized without changing the overall concept or operation of the present invention. In addition, at least one of the six mated pairs of depressions 406,408 exhibits sufficient contact to eliminate welds on axle 432.

Sleeve 431 is a generally rectangular shaped flat piece of metal which is formed around axle 432 in a manner well known in the art. A weld (not shown) is placed along the edges of the seam (not shown) of sleeve 431 in order to dispose the sleeve around axle 432. It should be understood that sleeve 431 could also be formed from a tube having an inner diameter equal to or slightly larger than the outer diameter of axle 432. In such an instance, sleeve tube 431 is cut to size and then slip fit over the end of axle 432. Sleeve 431 is optionally swaged or squeezed onto axle 432 by a swaging device as is well known in the art, creating sufficient contact between the sleeve and the axle. Six mated pairs of depressions 406 and 408 are plastically formed in sleeve 431 and axle 432, respectively, by a press. More particularly, sleeve 431 and axle 432 are placed into a press (not shown) having a pin (not shown), whereby the pin is pressed into the exterior surface of the sleeve and the axle by the press and then retracted, thereby forming each mated pair of depressions 486, 488 in the sleeve and the axle, respectively. More specifically, a first mated pair of depressions 406,408 is simultaneously formed in sleeve 431 and axle 432, respectively. Then a second mated pair of depressions 406,408 is simultaneously formed in sleeve 431 and axle 432, respectively, and so on until all six mated pairs of the depressions have been formed in the sleeve and the axle. Axle 432 is supported in a manner generally well known in the art such that the axle does not collapse during formation of the depressions.

After depressions 406,408 have been formed in sleeve 431 and axle 432, respectively, the axle is disposed into semicircular recess 474 formed in lower portion 471 of spring seat assembly 472. In this manner, axle-to-beam connection 405 is formed without welding sleeve 431 or spring seat assembly 472 to axle 432, thereby creating an axle-to-beam connection where the axle is free of welds.

Turning now to FIGS. 15A,15B, third preferred embodiment axle-to-beam connection 405 of the present invention is shown utilizing an alternative axle sleeve 431' having an inboardly extending portion 433 for mounting a brake system 428. Sleeve 431' includes six transversely aligned rows of two mated pairs of depressions 406 and 408, which are plastically formed in sleeve 431' and axle 432 respectively, by a press as described above.

As set forth above in the detailed description of axle-to-beam connection 405 of the present invention, the axle-to-beam connection results in a mechanical lock and sufficient contact of sleeve 431,431' to axle 432 which is free of welds or additional mechanical fasteners. More particularly, axle-to-beam connection 405 of the present invention creates sufficient contact between at least one of, and preferably all of, the mated pairs of depressions 406,408 of sleeve 431,431' and axle 432, respectively, to provide durability and strength to the sleeve to axle connection. Preferably, the contact creates a pre-load or compression at depressions 406,408 of sleeve 431,431' and axle 432, respectively. Because sleeve 431,431' is formed from a different material than the material used to faint axle 432, the sleeve exhibits a more plastic deformation while the axle exhibits a more elastic deformation. As a result, axle 432 exhibits more spring-back than sleeve 431,431' during the depression forming process, aiding in creating the sufficient contact between the sleeve and the axle. It should be understood that the extent of the preload or compression exhibited by mated depressions 406,408 of sleeve 431,431' and axle 432, respectively, is dependant on the yield strength of the materials used in forming the sleeve and the axle, as well as the relative thicknesses of the sleeve and the axle. Therefore, by changing the types of materials used for sleeve 431,431' and axle 432 as well as varying the thicknesses of each, axle-to-beam connection 405 can be tuned to create an increased or decreased preload or compression at depressions 406,408 in order to optimize the sufficient contact of the axle-to-beam connection. Residual stresses preferably also are created at each one of the mated pairs of depressions 406,408 of sleeve 431,431' and axle 432, respectively, as a result of the forming process. These residual stresses also aid in creating the sufficient contact and in reacting loads encountered by axle/suspension system 410 during operation of the heavy-duty vehicle. Swaging, as described above, can also contribute to sufficient contact at the sleeve to axle connection.

It is further contemplated that an adhesive could optionally be applied to the interior surface of sleeve 431,431' or to the exterior surface of axle 432 at the sleeve-to-axle interface, prior to formation of depressions 406,408. Because axle-to-beam connection 405 of the present invention eliminates welds directly on axle 432 and the stress risers and local mechanical property changes that occur with such welds, the durability of the axle can be improved, thereby improving the durability of axle-to-beam connection 405.

It is contemplated that other shapes, sizes, numbers and arrangements of depressions 406,408 could also be utilized without changing the overall concept of the present invention.

The manner in which axle-to-beam connection 405 is formed eliminates tolerance issues with regard to alignment of depressions 406,408 formed in sleeve 431,431' and axle 432, respectively, because each one of the mated pairs of depressions are simultaneously formed in the sleeve and the axle.

Figure 16:
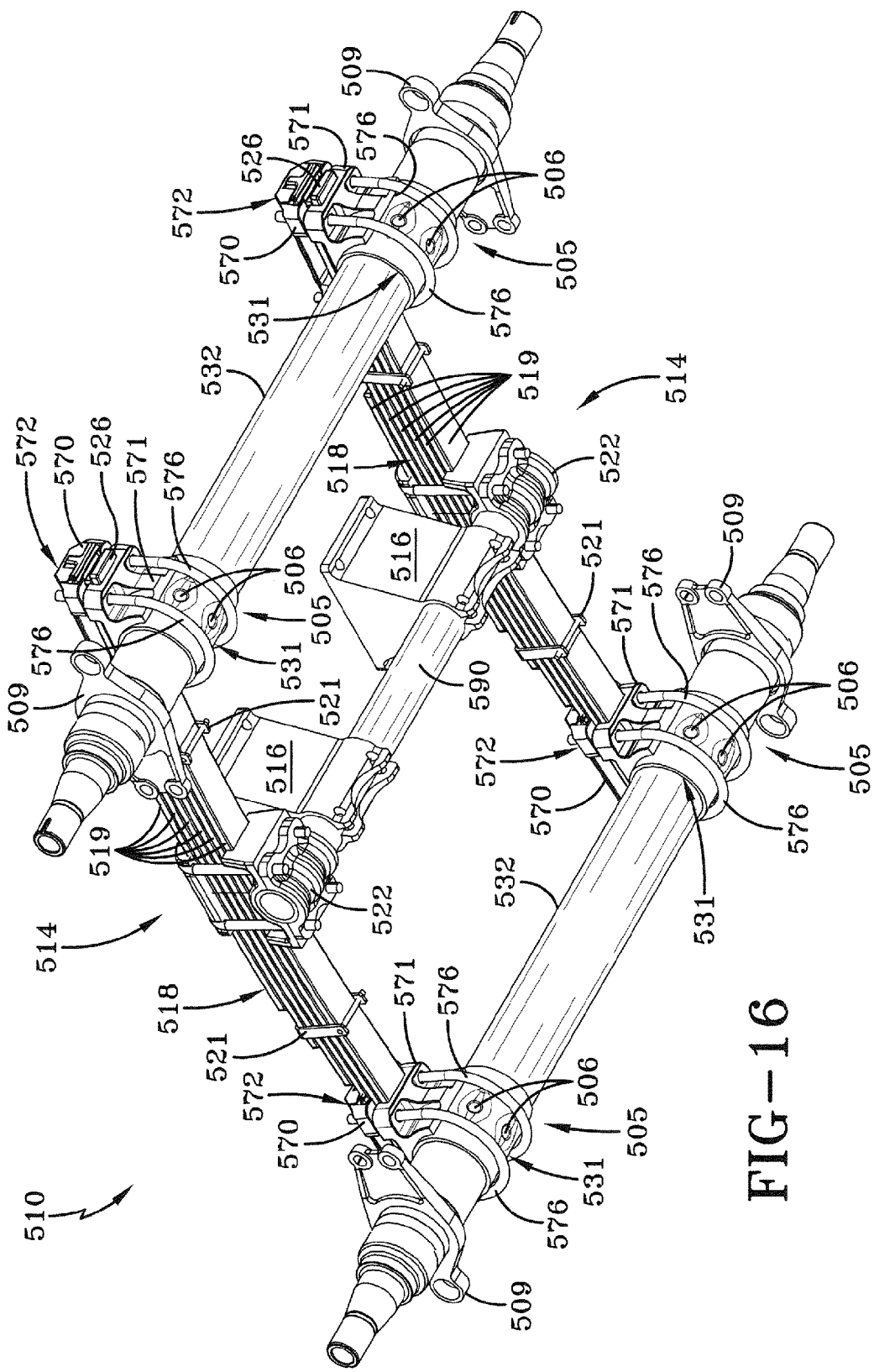
FIG. 16 is a bottom rear perspective view of a fourth embodiment axle-to-beam connection of the present invention for a tandem axle/suspension system, showing the pair of suspension assemblies, the axle sleeves mounted on the axles and the spring seat assemblies mounted on the axle sleeves via U-bolts, and further showing depressions formed in the axle sleeves.
Figure 16A:
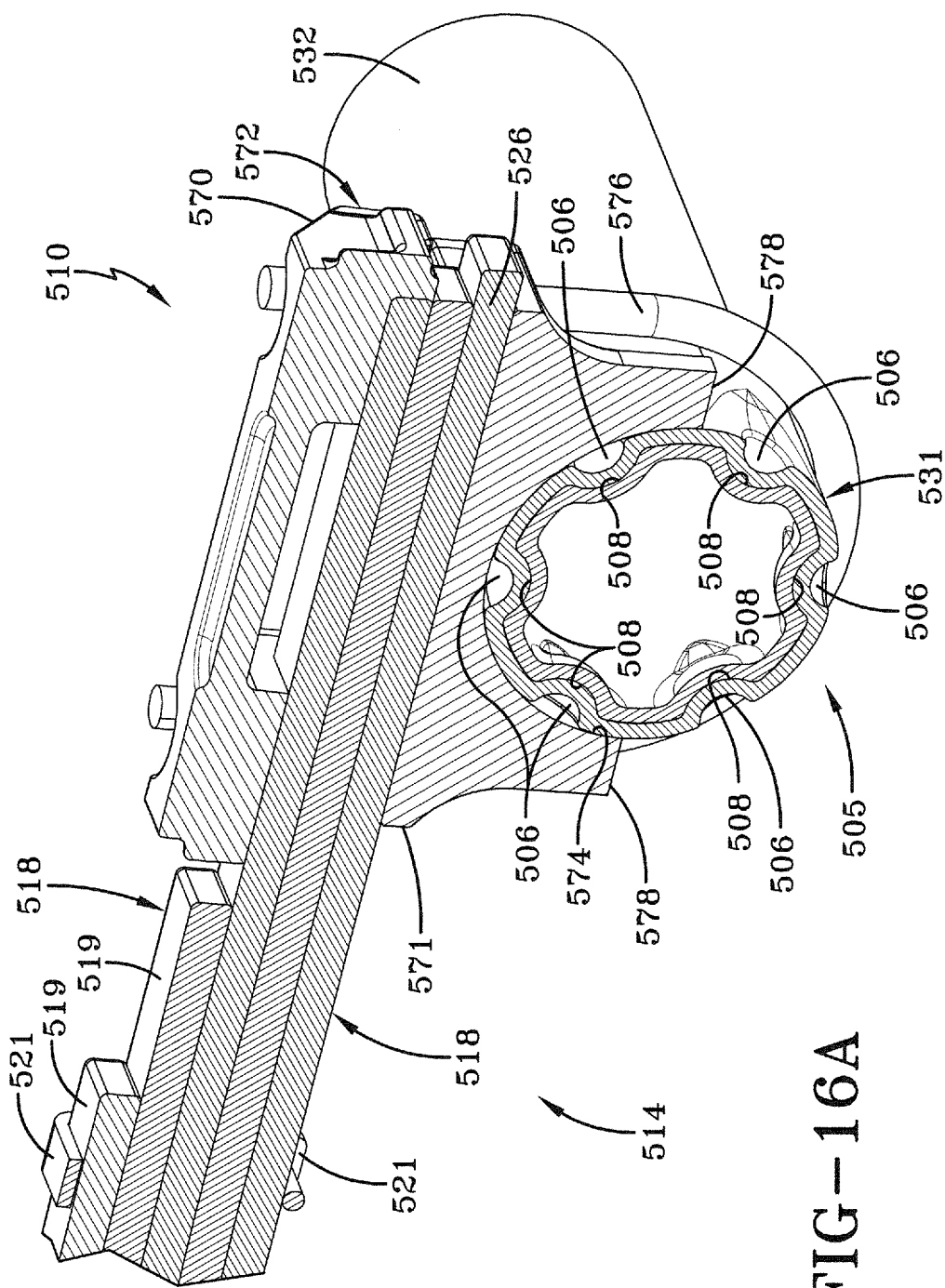
FIG. 16A is an enlarged fragmentary bottom rear perspective view of the driver side rear axle-to-beam connection shown in FIG. 16, but with the axle, axle sleeve, spring seat assembly, leaf springs and spring leaf U-bolt assembly in section, and showing the depressions formed in the axle sleeve and the axle.
Figure 16B:
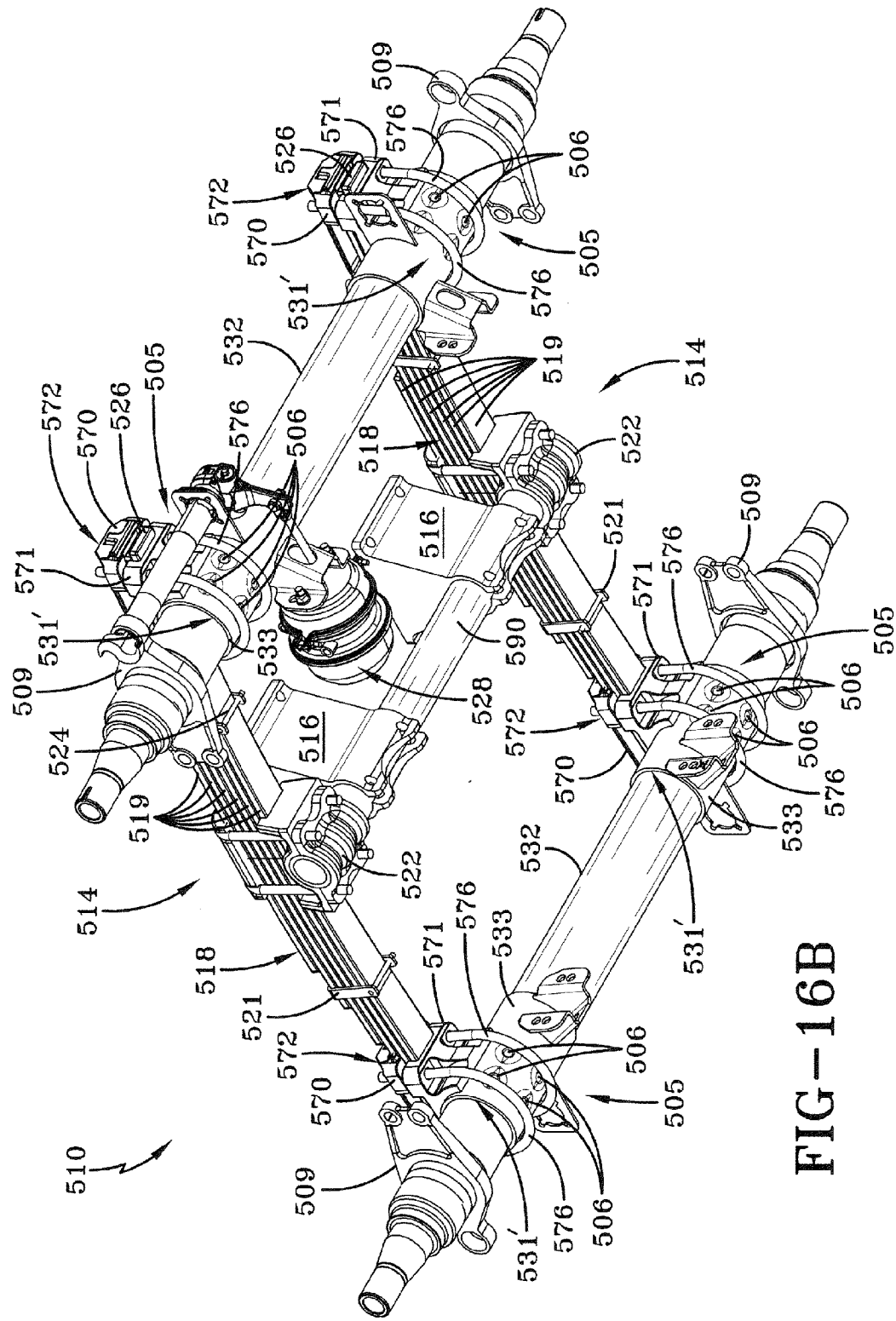
FIG. 16B is a view similar to FIG. 16, but showing an alternative axle sleeve with an inboard extension and transversely aligned rows of depressions, and also showing a brake system mounted on the sleeve extension of the driver side rear suspension assembly.
Figure 16C:
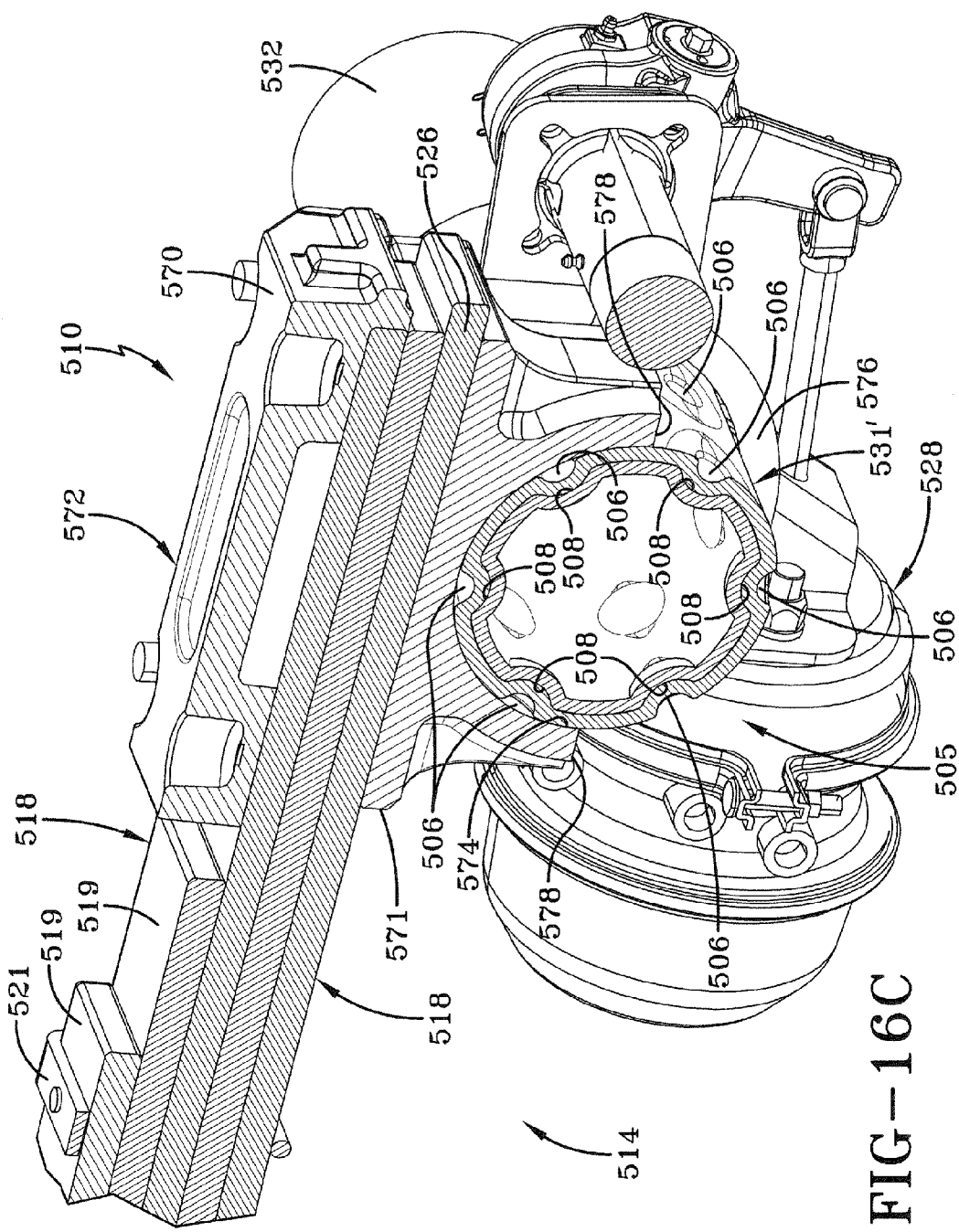
FIG. 16C is an enlarged fragmentary rear perspective view of the driver side rear axle-to-beam connection shown in FIG. 16B, but with the axle, axle sleeve, spring seat assembly, portions of the brake system, leaf springs and spring leaf U-bolt assembly in section, and showing the transversely aligned rows of depressions formed in the axle sleeve and the axle.

A fourth preferred embodiment axle-to beam connection is shown generally at 505 in FIG. 16-16C incorporated into a tandem axle/suspension system 510. Tandem axle/suspension system 510 is a spring-beam type axle/suspension system, which is generally well known to those having skill in the art. Tandem axle/suspension system 510 includes a pair of suspension assemblies 514 that generally mirror one another. For sake of clarity, only the driver side suspension assembly 514 will be described below.

With specific reference to FIGS. 16 and 16A, driver side suspension assembly 514 includes a spring beam 518. Spring beam 518 is formed from vertically stacked leaves 519, which are fastened together by straps 521 and spring leaf U-bolt assembly 522. A stabilizer bar 590 is fastened to U-bolt 522 and extends between the pair of suspension assemblies 514. A hanger 516 is connected to stabilizer bar 590 and is mounted on the main members (not shown) of the heavy-duty vehicle (not shown). Spring beam 518 includes a front end (not shown) and a rear end 526. Front end (not shown) and rear end 526 of beam 518 are each connected to an axle 532 via front and rear axle-to-beam connections 505, respectively. Because front and rear axle-to-beam connections 505 are generally similar to one another, for sake of clarity, only the rear axle-to-beam connection will be described herein. More particularly, spring beam rear end 526 of spring beam 518 is sandwiched between an upper portion 570 and a lower portion 571 of a spring seat assembly 572. Lower portion 571 of spring seat assembly 572 is formed with a semi-circular recess 574 into which an upper portion of a sleeve 531 and axle 532 are disposed. Sleeve 531 seats in recess 574 of lower portion 571 of spring seat assembly 572. A pair of U-bolts 576 are disposed through pairs of aligned openings (not shown) formed in upper and lower portions 570,571 of spring seat assembly 572 and are secured thereto in a manner well known to those having skill in the art. U-bolts 576 serve as an additional reinforcement to axle-to-beam connection 505 of the present invention, but are not intended to create a preload or compression between sleeve 531 and axle 532, as is the case with certain types of prior art axle/suspension systems. A brake spider 509 is mounted adjacent to the end of axle 532.

In accordance with one of the primary features of the present invention, sleeve 531 and axle 532 are formed with mated pairs of depressions 506 and 508, respectively, as shown in FIGS. 16 and 16A. More particularly, six mated pairs of depressions 506,508 are formed in and equally spaced around the circumference of sleeve 531 and axle 532. Each mated pair of depressions 506,508 engage one another and serve as a mechanical lock between sleeve 531 and axle 532. It should be understood that at least one mated pair of depressions is necessary in order for axle-to-beam connection 505 of the present invention to function properly, but from one to five and also more than six mated pairs of depressions could be utilized without changing the overall concept or operation of the present invention. In addition, at least one of the six mated pairs of depressions 506,508 exhibits sufficient contact to eliminate welds on axle 532.

Sleeve 531 is a generally rectangular shaped flat piece of metal, which is formed around axle 532 in a manner well known in the art. A weld (not shown) is placed along the edges of the seam (not shown) of sleeve 531 in order to dispose the sleeve around axle 532. It should be understood that sleeve 531 could also be formed from a tube having an inner diameter equal to or slightly larger than the outer diameter of axle 532. In such an instance, sleeve tube 531 is cut to size and then slip fit over the end of axle 532. Sleeve 531 is optionally swaged or squeezed onto axle 532 by a swaging device as is well known in the art, creating sufficient contact between the sleeve and the axle. Six mated pairs of depressions 506 and 508 are plastically formed in sleeve 531 and axle 532, respectively, by a press. More particularly, sleeve 531 and axle 532 are placed into a press (not shown) having a pin (not shown), whereby the pin is pressed into the exterior surface of the sleeve and the axle by the press and then retracted, thereby forming each mated pair of depressions 586, 588 in the sleeve and the axle, respectively. Axle 532 is supported in a manner generally well known in the art such that the axle does not collapse during formation of the depressions.

After depressions 506,508 have been formed in sleeve 531 and axle 532, respectively, the axle is disposed into semicircular recess 574 formed in lower portion 571 of spring seat assembly 572. In this manner, axle to-beam connection 505 is formed without welding sleeve 531 or spring seat assembly 572 to axle 532, thereby creating an axle-to-beam connection where the axle is free of welds.

Turning now to FIGS. 16B,16C, fourth preferred embodiment axle-to-beam connection 505 of the present invention is shown utilizing an alternative axle sleeve 531' having an inboardly extending portion 533 for mounting a brake system 528. Sleeve 531' includes six transversely aligned rows of two mated pairs of depressions 506 and 508, which are plastically formed in sleeve 531' and axle 532 respectively, by a press as described above.

As set forth above in the detailed description of axle-to-beam connection 505 of the present invention, the axle-to-beam connection results in a mechanical lock and sufficient contact of sleeve 531,531' to axle 532 which is free of welds or additional mechanical fasteners. More particularly, axle-to-beam connection 505 of the present invention creates sufficient contact between at least one of, and preferably all of, the mated pairs of depressions 506,508 of sleeve 531,531' and axle 532, respectively, to provide durability and strength to the sleeve to axle connection. Preferably, the contact creates a pre-load or compression at depressions 506,508 of sleeve 531,531' and axle 532, respectively. Because sleeve 531,531' is formed from a different material than the material used to form axle 532, the sleeve exhibits a more plastic deformation while the axle exhibits a more elastic deformation. As a result, axle 532 exhibits more spring-back than sleeve 531,531' during the depression forming process, aiding in creating the sufficient contact between the sleeve and the axle. It should be understood that the extent of the preload or compression exhibited by mated depressions 506,508 of sleeve 531,531' and axle 532, respectively, is dependant on the yield strength of the materials used in forming the sleeve and the axle, as well as the relative thicknesses of the sleeve and the axle. Therefore, by changing the types of materials used for sleeve 531,531' and axle 532 as well as varying the thicknesses of each, axle-to-beam connection 505 can be tuned to create an increased or decreased preload or compression at depressions 506,508 in order to optimize the sufficient contact of the axle-to-beam connection. Residual stresses preferably also are created at each one of the mated pairs of depressions 506,508 of sleeve 531,531' and axle 532, respectively, as a result of the forming process. These residual stresses also aid in creating the sufficient contact and in reacting loads encountered by axle/suspension system 510 during operation of the heavy-duty vehicle. Swaging, as described above, can also contribute to sufficient contact at the sleeve to axle connection.

It is further contemplated that an adhesive could optionally be applied to the interior surface of sleeve 531,531' or to the exterior surface of axle 532 at the sleeve-to-axle interface, prior to formation of depressions 506,508. Because axle-to-beam connection 505 of the present invention eliminates welds directly on axle 532 and the stress risers and local mechanical property changes that occur with such welds, the durability of the axle can be improved, thereby improving durability of axle-to-beam connection 505.

It is contemplated that other shapes, sizes, numbers and arrangements of depressions 506,508 could also be utilized without changing the overall concept of the present invention.

The manner in which axle-to-beam connection 505 is formed eliminates tolerance issues with regard to alignment of depressions 506,508 formed in sleeve 531,531' and axle 532, respectively, because each one of the mated pairs of depressions are simultaneously formed in the sleeve and the axle.

Figure 17:
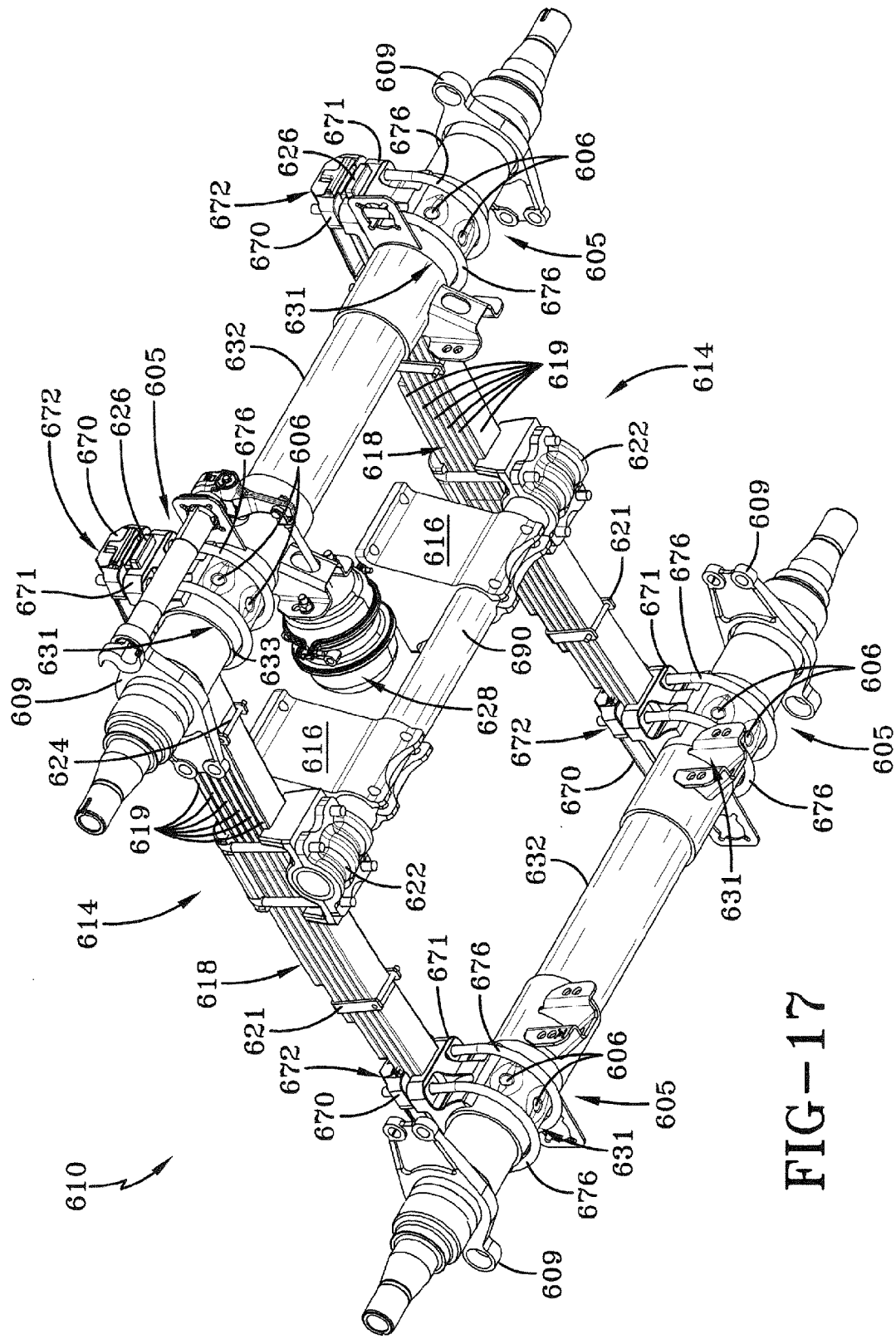
FIG. 17 is a rear perspective view of a fifth embodiment axle-to-beam connection of the present invention for a tandem axle/suspension system, showing the sleeve with depressions surrounding the axle and also showing the brake system mounted on the axle sleeve, and further showing two rows of transversely aligned depressions formed in the axle sleeve.
Figure 18:
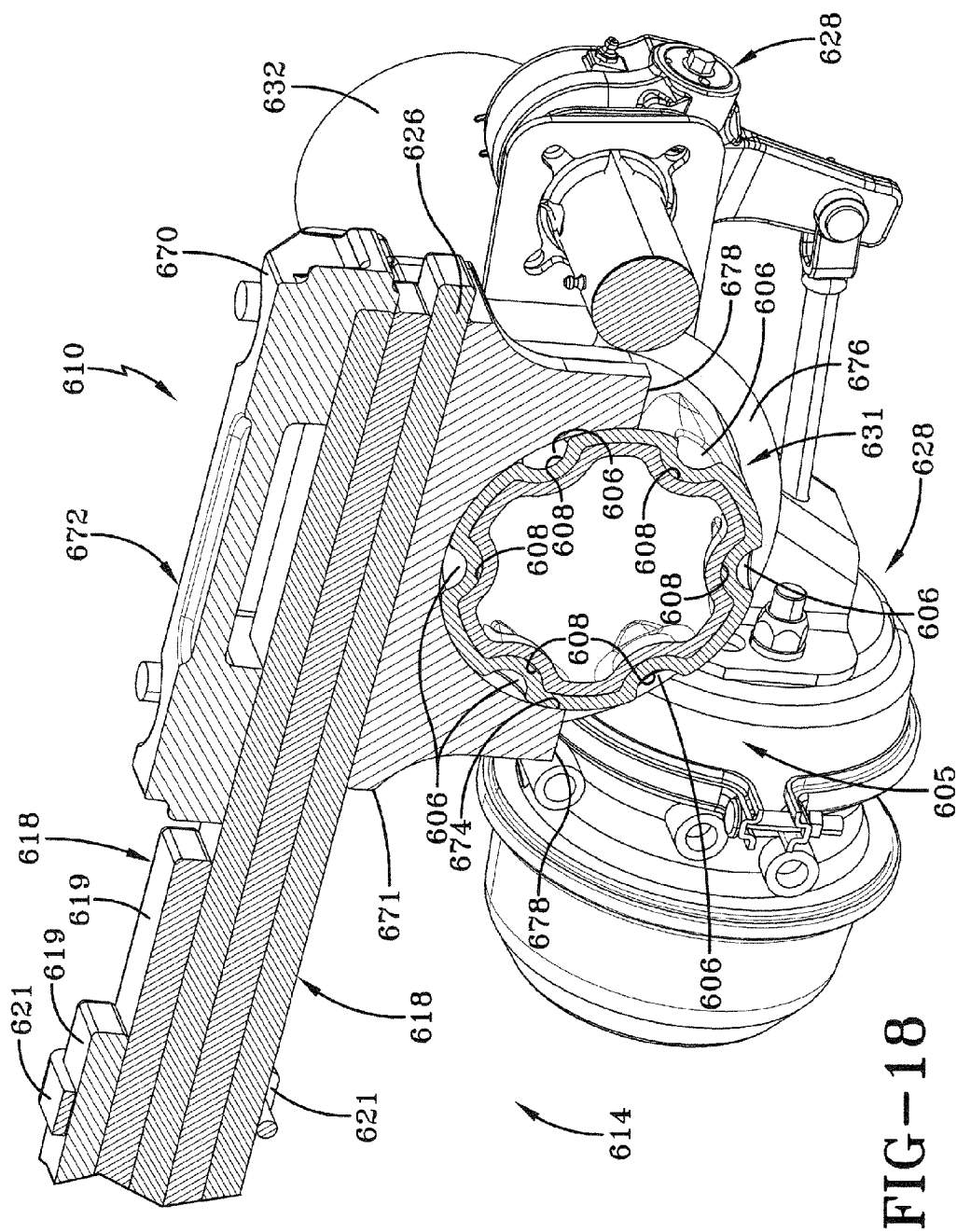
FIG. 18 is a view similar to FIG. 17 with portions in section, showing the depressions formed in the axle sleeve and the axle and also showing a depending protrusion formed on the spring seat assembly mating with the top-most depression of the axle sleeve.

A fifth preferred embodiment axle-to beam connection is shown generally at 605 in FIGS. 17-18 incorporated into a tandem axle/suspension system 610. Tandem axle/suspension system 610 is a spring-beam type axle/suspension system, which is generally well known to those having skill in the art. Tandem axle/suspension system 610 includes a pair of suspension assemblies 614 that generally mirror one another. For sake of clarity, only the driver side suspension assembly 614 will be described below.

Driver side suspension assembly 614 includes a spring beam 618. Spring beam 618 is formed from vertically stacked leaves 619, which are fastened together by straps 621 and spring leaf U-bolt assembly 622. A stabilizer bar 690 is fastened to U-bolt 622 and extends between the pair of suspension assemblies 614. A hanger 616 is connected to stabilizer bar 690 and is mounted on the main members (not shown) of the heavy-duty vehicle (not shown). Spring beam 618 includes a front end (not shown) and a rear end 626. Front end (not shown) and rear end 626 of beam 618 are each connected to an axle 632 via front and rear axle-to-beam connections 605, respectively. Because front and rear axle-to-beam connections 605 are generally similar to one another, for sake of clarity, only the rear axle-to-beam connection will be described herein. More particularly, spring beam rear end 626 is sandwiched between an upper portion 670 and a lower portion 671 of a spring seat assembly 672. Lower portion 671 of spring seat assembly 672 is formed with a semi-circular recess 674 (FIG. 18) into which an upper portion of a sleeve 631 and axle 632 are disposed. Sleeve 631 seats in recess 674 of lower portion 671 of spring seat assembly 672 and extends inboardly along axle 632. A pair of U-bolts 676 (only one shown) are disposed through pairs of aligned openings (not shown) formed in upper and lower portions 670,671 of spring seat assembly 672 and are secured thereto in a manner well known to those having skill in the art. U-bolts 676 serve as an additional reinforcement to axle-to-beam connection 605 of the present invention, but are not intended to create a preload or compression between sleeve 631 and axle 632 as is the case with certain types of prior art axle/suspension systems. A brake spider 609 is attached adjacent to the end of axle 632. A brake system 628 is attached to sleeve 631 in a manner well known to those having skill in the art, such as welding.

In accordance with one of the primary features of the present invention, sleeve 631 and axle 632 are formed with mated pairs of depressions 606 and 608, respectively. More specifically, in fifth preferred embodiment axle-to-beam connection 605, six mated pairs of depressions 606,608 are equally spaced around the circumference of sleeve 631 and axle 632. Each mated pair of depressions 606,608 engage one another and serve as a mechanical lock between sleeve 631 and axle 632. It is understood that at least one mated pair of depressions are necessary in order for axle-to-beam connection 605 of the present invention to function properly, but from one to five and also more than six mated pairs of depressions could also be utilized without changing the overall concept of the present invention. In addition, at least one of the mated pairs of depressions 606,608 exhibits sufficient contact to eliminate welds on axle 632.

Sleeve 631 is a generally rectangular shaped flat piece of metal, which is formed around axle 632 in a manner well known in the art. A weld (not shown) is placed along the edges of the seam (not shown) of sleeve 631 in order to dispose the sleeve around axle 632. It should be understood that sleeve 631 could also be formed from a tube having an inner diameter equal to or slightly larger than the outer diameter of axle 632. In such an instance, sleeve tube 631 is cut to size and then slip fit over the end of axle 632. Sleeve 631 is optionally swaged or squeezed onto axle 632 by a swaging device as is well known in the art, creating sufficient contact between the sleeve and the axle. Six mated pairs of depressions 606 and 608 are plastically formed in sleeve 631 and axle 632, respectively, by a press. More particularly, sleeve 631 and axle 632 are placed into a press (not shown) having a pin (not shown), whereby the pin is pressed into the exterior surface of the sleeve and the axle by the press and then retracted, thereby forming each mated pair of depressions 686, 688 in the sleeve and the axle, respectively. More specifically, a first mated pair of depressions 606,608 is simultaneously formed in sleeve 631 and axle 632, respectively. Then a second mated pair of depressions 606,608 is simultaneously formed in sleeve 631 and axle 632, respectively, and so on until all six mated pairs of the depressions have been formed in the sleeve and the axle. Axle 632 is supported in a manner generally well known in the art such that the axle does not collapse during formation of the depressions.

After depressions 606,608 have been formed in sleeve 631 and axle 632, respectively, the axle is disposed into semicircular recess 674 formed in lower portion 671 of spring seat assembly 672. A downwardly extending protrusion 680 formed on spring seat assembly lower portion 671 matingly engages topmost depression 606 of sleeve 631. In this manner, axle to-beam connection 605 is formed without welding sleeve 631 or spring seat assembly 672 to axle 632, thereby creating an axle-to-beam connection where the axle is free of welds.

As set forth above in the detailed description of axle-to-beam connection 605 of the present invention, the axle-to-beam connection results in a mechanical lock and sufficient contact of sleeve 631 to axle 632 which is free of welds or additional mechanical fasteners. More particularly, axle-to-beam connection 605 of the present invention creates sufficient contact between at least one of, and preferably all of, the six mated pairs of depressions 606,608 of sleeve 631 and axle 632, respectively, to provide durability and strength to the sleeve to axle connection. Preferably, the contact creates a pre-load or compression at depressions 606,608 of sleeve 631 and axle 632, respectively. Because sleeve 631 is formed from a different material than the material used to form axle 632, the sleeve exhibits a more plastic deformation while the axle exhibits a more elastic deformation. As a result, axle 632 exhibits more spring-back than sleeve 631 during the depression forming process, aiding in creating the sufficient contact between the sleeve and the axle. It should be understood that the extent of the preload or compression exhibited by mated depressions 606,608 of sleeve 631 and axle 632, respectively, is dependant on the yield strength of the materials used in forming the sleeve and the axle, as well as the relative thicknesses of the sleeve and the axle. Therefore, by changing the types of materials used for sleeve 631 and axle 632 as well as varying the thicknesses of each, axle-to-beam connection 605 can be tuned to create an increased or decreased preload or compression at depressions 606,608 in order to optimize the sufficient contact of the axle-to-beam connection. Residual stresses preferably also are created at each one of the six mated pairs of depressions 606,608 of sleeve 631 and axle 632, respectively, as a result of the forming process. These residual stresses also aid in creating the sufficient contact and in reacting loads encountered by axle/suspension system 610 during operation of the heavy-duty vehicle. Swaging, as described above, can also contribute to sufficient contact at the sleeve to axle connection.

It is further contemplated that an adhesive could optionally be applied to the interior surface of sleeve 631 or to the exterior surface of axle 632 at the sleeve-to-axle interface, prior to formation of depressions 606,608. Because axle-to-beam connection 605 of the present invention eliminates welds directly on axle 632 and the stress risers and local mechanical property changes that occur with such welds, the durability of the axle can be improved, thereby improving durability of axle-to-beam connection 605.

It is contemplated that other shapes, sizes, numbers and arrangements of depressions 606,608 could also be utilized without changing the overall concept of the present invention.

The manner in which axle-to-beam connection 605 is formed eliminates tolerance issues with regard to alignment of depressions 606,608 formed in sleeve 631 and axle 632, respectively, because each one of the mated pairs of depressions are simultaneously formed in the sleeve and the axle.

Axle-to-beam connections 205,305,405,505,605 of the present invention overcome the types of potential issues associated with prior art axle to beam connection 105 which, because sleeve 131 or other similar functioning structure is welded directly to axle 132 at sleeve windows 133F,R or other locations, can potentially create significant stress risers and local mechanical property changes in the axle, as is generally well known in the art. These stress risers and local mechanical property changes can in turn potentially reduce the life expectancy of axle 132.

Axle-to-beam connection 205,305,405,505,605 of the present invention overcomes the potential issues associated with the prior art axle-to-beam connections by eliminating all of the welds on axles 232,332,432,532,632, respectively, and thereby producing a mechanical lock which eliminates all of the stress risers and local mechanical property changes in the axle caused by welds as described above. Furthermore, axle-to-beam connection 205,305,405,505,605 of the present invention increases durability of axles 232,332,432,532,632, by eliminating welds directly on the axle, thereby improving the life expectancy and durability of axle-to-beam connections 205,305,405,505. It is also possible that by eliminating welds directly on axle 232,332,432,532,632 and the stress risers and local mechanical property changes that occur with such welds, that the thickness of the axle could potentially be reduced for certain applications, thereby potentially allowing for weight savings in the axle/suspension system.

In addition axle-to-beam connections 205,305,405,505,605 of the present invention result in a mechanical lock of the sleeve to the axle which is free of welds or additional mechanical fasteners. More particularly, axle-to-beam connections 205,305,405,505,605 of the present invention generally prevent rotation and lateral movement of the axle and sleeve relative to one another, and also create sufficient contact between at least one of, and preferably all of, the mated pairs of depressions of the sleeve and the axle, respectively, to provide durability and strength to the sleeve to axle connection. Preferably, the sufficient contact creates a pre-load or compression at least one of, and preferably all of, the pairs of mated depressions formed in the sleeve and the axle, respectively. Because the sleeve is formed from a different material than the material used to form the axle, the sleeve exhibits a more plastic deformation while the axle exhibits a more elastic deformation. As a result, the axle exhibits more spring-back than the sleeve during the depression forming process, aiding in creating the sufficient contact between the sleeve and the axle. It should be understood that the extent of the preload or compression exhibited by the depressions of the sleeve and the axle, respectively, is dependant on the yield strength of the materials used in forming the sleeve and the axle as well as the relative thicknesses of the sleeve and the axle. Therefore, by changing the types of materials used for the sleeve and the axle as well as varying the thicknesses of each, axle-to-beam connections 205,305, 405,505,605 can be tuned to create an increased or decreased preload or compression at the depressions in order to optimize the sufficient contact of the axle-to-beam connection. Residual stresses preferably also are created at the mated pairs of the depressions of the sleeve and the axle, respectively, as a result of the forming process. These residual stresses also aid in creating the sufficient contact and in reacting loads encountered by the axle/suspension system during operation of the heavy-duty vehicle. In certain embodiments, swaging, as described above, can also contribute to sufficient contact at the sleeve to axle connection.

The manner in which axle-to-beam connections 205,305, 405,505,605 are formed eliminate tolerance issues with respect to alignment of the mated pairs of depressions formed in the sleeve and the axle, because each one of the mated pairs of depressions are simultaneously formed in the sleeve and the axle. More particularly, prior art structures and methods have utilized a depression in the axle, but in comparison and contrast, employ a separately formed similarly-shaped sphere in the axle seat shell, with the shell and the axle being subsequently brought together so that the sphere and the depression generally mate with one another. However, this prior art structure and process creates tolerance issues between the sphere and the depression of the separate components, resulting in irregular fit or alignment of the components and non-uniform contact between the surfaces of the sphere and depression of the shell and the axle. These tolerance issues have been overcome by axle-to-beam connection 205,305,405,505,605 of the present invention, which simultaneously forms the mated pairs of depressions in the sleeve and the axle, respectively, thereby eliminating irregular fit, alignment and non-uniform contact issues.

Figure 19:
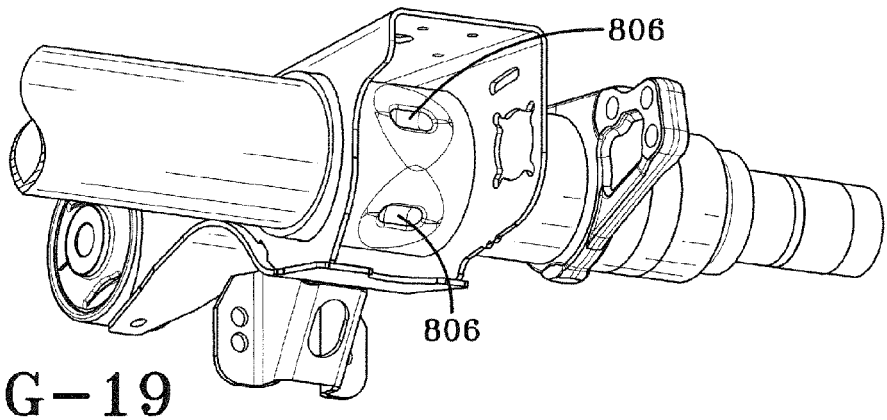
FIG. 19 is fragmentary rear perspective view of a sixth embodiment axle-to-beam connection of the present invention, which is similar to the first embodiment shown in FIGS. 5-9, but showing horizontally elongated depressions formed in the axle sleeve.
Figure 20:
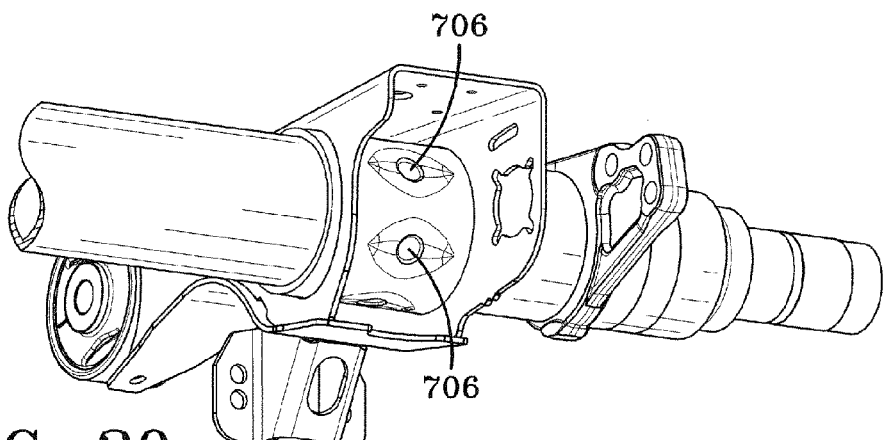
FIG. 20 is a fragmentary perspective view of a seventh embodiment axle-to-beam connection of the present invention, which is similar to the first embodiment shown in FIGS. 5-9, but showing circular depressions formed in the axle sleeve.
Figure 21:
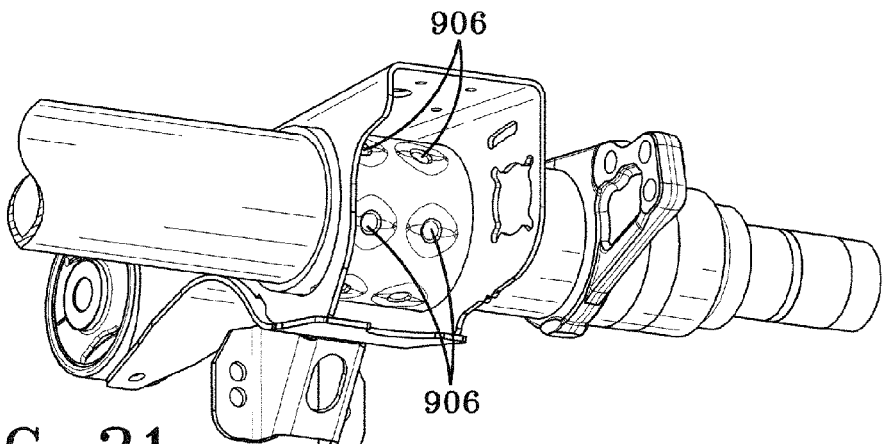
FIG. 21 is a fragmentary perspective view of an eighth embodiment axle-to-beam connection of the present invention, which is similar to the first embodiment shown in FIGS. 5-9, but showing transversely aligned rows of circular depressions formed in the axle sleeve. Similar numerals refer to similar parts throughout the drawings.

It is contemplated that preferred embodiment axle-to-beam connections 205,305,405,505,605 of the present invention could be utilized on trucks, tractor-trailers or other heavy-duty vehicles having one or more than one axle without changing the overall concept or operation of the present invention. It is further contemplated that preferred embodiment axle-to-beam connections 205,305,405,505,605 of the present invention could be utilized on vehicles having frames or subframes which are moveable or non-movable without changing the overall concept of the present invention. It is yet even further contemplated that preferred embodiment axle-to-beam connections 205,305,405,505,605 of the present invention could be utilized on all types of air-ride leading and/or trailing arm beam-type axle/suspension system designs known to those skilled in the art without changing the overall concept or operation of the present invention. For example, the present invention finds application in beams or arms that are made of materials other than steel, such as aluminum, other metals, metal alloys, composites, and/or combinations thereof. It is also contemplated that preferred embodiment axle-to-beam connections 205,305,405,505,605 of the present invention could be utilized on axle/suspension systems having either an overslung/top-mount configuration or an underslung/bottom-mount configuration, without changing the overall concept of the present invention. The present invention also finds application in beams or arms with different designs and/or configurations than that shown and described herein, such as solid beams, shell-type beams, truss structures, intersecting plates, spring beams and parallel plates. The present invention also finds application in intermediary structures such as spring seats. It is yet even further contemplated that preferred embodiment axle-to-beam connections 205,305,405,505,605 of the present invention could be utilized in conjunction with axles and sleeves having varied wall thicknesses, different shapes, and being formed or constructed from different materials, without changing the overall concept or operation of the present invention. It is even further contemplated that preferred embodiment axle-to-beam connections 205,305,405,505,605 of the present invention could be formed utilizing a sleeve having a generally rectangular flat shape, with the sleeve being formed around the axle and the ends of the sleeve being mechanically locked to one another around the axle by interlocking tabs or other such mechanical locking means without changing the overall concept or operation of the present invention. It is also contemplated that preferred embodiment axle-to-beam connections 205,305,405,505,605 of the present invention could be utilized in conjunction with other types of air-ride rigid beam-type axle/suspension systems such as those using U-bolts, U-bolt brackets/axle seats and the like, and other axle-to-beam connections such as the one shown in U.S. patent application Ser. No. 12/912,240 filed on Oct. 26, 2010, without changing the overall concept or operation of the present invention. It is even further contemplated that preferred embodiment axle-to-beam connections 205,305,405, 505,605 of the present invention could be utilized with other types of axle/suspension systems, such as mid-lift, trailer four-spring or tandem axle/suspension systems or those that utilize leaf springs, without changing the overall concept or operation of the present invention. It is yet even further contemplated that depressions 206,208,306,308,406,408,506,508 and 606,608 formed in sleeves 231,331,431,431',531,531',631 and axles 232,332, 432,532,632, respectively, could be circular shaped as shown at 706 in FIG. 20, elongated or oval shaped as set forth at 806 in FIG. 19, could be circular shaped and paired together as shown at 906 in FIG. 21, or could be other shapes, sizes and arrangements including combinations of one or more of the examples set forth above, without changing the overall concept or operation of the present invention. It is also contemplated that mated pairs of depressions 206,208,306,308,406, 408,506,508 and 606,608 formed in sleeves 231,331,431, 431',531,531',631 and axles 232,332,432,532,632, respectively, could be formed one mated pair at a time, more than one mated pair at a time, or even all at once, without changing the overall concept or operation of the present invention. It is yet even further contemplated that the swaging of axle sleeves 231,431,431',531,531',631 could also be utilized in conjunction with other types of axle sleeves, including prior art axle sleeves having windows with or without welds or other fastening means, without changing the overall concept or operation of the present invention. It is even further contemplated that axle sleeves 231,431,431',531,531',631 and axles 232,432,532,632 of preferred embodiment axle-to-beam connections 205,405,505,605 of the present invention could be simultaneously swaged and formed with depressions 206,208,406,408,506,508 and 606,608 without changing the overall concept or operation of the present invention.

Accordingly, the axle-to-beam connection of the present invention is simplified, provides an effective, safe, inexpensive and efficient structure and method which achieves all the enumerated objectives, provides for eliminating difficulties encountered with prior axle-to-beam connections, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the axle-to-beam connection of the present invention is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. An axle-to-beam connection for an axle to suspension assembly mounting system comprising:
 a) an axle formed with at least one depression; and
 b) a sleeve formed with at least one depression having a continuous boundary, said at least one sleeve depression being formed in an exterior surface of the sleeve, said sleeve being disposed at least partially about said axle, the at least one sleeve depression matingly engaging said at least one axle depression to form a mated pair of depressions for securing the sleeve to the axle, wherein said sleeve is plastically deformed and said axle is elastically deformed when the sleeve is matingly secured to the axle, said sleeve being immovably mounted to said suspension assembly.

2. The axle-to-beam connection of claim 1, wherein said mated pair of depressions form a weld-free mechanical lock that exhibits a pre-load or compression between said sleeve depression and said axle depression.

3. The axle-to-beam connection of claim 1, wherein said at least one sleeve depression comprises eight sleeve depressions and said at least one axle depression comprises eight axle depressions, each one of said eight sleeve depressions matingly engaging a respective one of said eight axle depressions to form eight mated pairs of depressions.

4. The axle-to-beam connection of claim 3, wherein said eight mated pairs of depressions are spaced around said sleeve and said axle.

5. The axle-to-beam connection of claim 3, wherein said eight mated pairs of depressions are formed in rows of two spaced around said sleeve and said axle.

6. The axle-to-beam connection of claim 3, wherein said eight mated pairs of depressions are formed in offset rows of two spaced around said sleeve and said axle.

7. The axle-to-beam connection of claim 1, wherein said sleeve is swaged, squeezed or crimped onto said axle.

8. The axle-to-beam connection of claim 1, wherein said at least one sleeve depression and said at least one axle depression are generally circular.

9. The axle-to-beam connection of claim 1, wherein said at least one sleeve depression and said at least one axle depression are generally elongated.

10. The axle-to-beam connection of claim 1, wherein an adhesive is applied between said sleeve and said axle.

11. An axle-to-beam connection for an axle to suspension assembly mounting system comprising:
   a) an axle formed with eight axle depressions; and
   b) a sleeve formed with eight sleeve depressions, said sleeve being disposed at least partially about said axle, each one of said eight sleeve depressions matingly engaging a respective one of said eight axle depressions to form eight mated pairs of depressions for securing the sleeve to the axle, said eight mated pairs of depressions being formed in rows of two spaced around said sleeve and said axle, said sleeve being immovably mounted to said suspension assembly.

12. An axle-to-beam connection for an axle to suspension assembly mounting system comprising:
   a) an axle formed with eight axle depressions; and
   b) a sleeve formed with eight sleeve depressions, said sleeve being disposed at least partially about said axle, each one of said eight sleeve depressions matingly engaging a respective one of said eight axle depressions to form eight mated pairs of depressions for securing the sleeve to the axle, said eight mated pairs of depressions being formed in offset rows of two spaced around said sleeve and said axle, said sleeve being immovably mounted to said suspension assembly.

* * * * *